United States Patent [19]

Noguchi et al.

[11] Patent Number: 5,210,728

[45] Date of Patent: May 11, 1993

[54] ELEVATION MECHANISM IN DISK PLAYER WITH DISK CHANGER FUNCTIONS INCLUDING AN ADJUSTABLE DRIVE NUT WHICH RAISES AND LOWERS DISCS

[75] Inventors: Yasuhiro Noguchi, Tokorozawa; Kazuhiro Musashi, Kodaira, both of Japan

[73] Assignee: Nakamichi Corporation, Tokyo, Japan

[21] Appl. No.: 706,957

[22] Filed: May 29, 1991

[30] Foreign Application Priority Data

May 31, 1990 [JP] Japan ................................ 2-143216
May 31, 1990 [JP] Japan ................................ 2-143217

[51] Int. Cl.⁵ ........................ G11B 17/22; G11B 17/26
[52] U.S. Cl. ........................................ 369/36; 369/38; 369/178; 369/191; 360/98.06
[58] Field of Search ........................ 369/34, 36, 38, 39, 369/191, 194, 178, 192; 360/91, 92, 98.04, 98.06, 99.07

[56] References Cited

U.S. PATENT DOCUMENTS 4,481,618 11/1984 Nakayama ........................ 369/194
4,918,548 4/1990 O'Donnell et al. .................. 360/92

FOREIGN PATENT DOCUMENTS 0023358 2/1983 Japan ........................... 360/98.04
0204547 8/1988 Japan ............................. 369/191
0291254 11/1988 Japan ............................. 369/191

Primary Examiner—Stuart S. Levy
Assistant Examiner—Joseph A. Rhoa
Attorney, Agent, or Firm—Dann, Dorfman, Herrell and Skillman

[57] ABSTRACT

A disk player with disk changer functions has an elevatable stacker for storing plural disks for playback. A mechanism or elevation of the stacker relative to a main body of the player includes a motor, a threaded shaft (95) rotated by the motor and a nut (96) fixed to the bottom of the stacker in engagement of the threaded shaft (95) to allow elevation of the stacker in response to rotation of the threaded shaft. The threaded shaft has a smaller diameter than a central aperture of the disk when received in the stacker. The fixed position of the nut may be adjusted to vary relative angular position with respect to the threaded shaft. A projection (96) may be inserted into one of a plurality of apertures (903) to vary or adjust the position of the nut relative to the shaft (95).

1 Claim, 34 Drawing Sheets

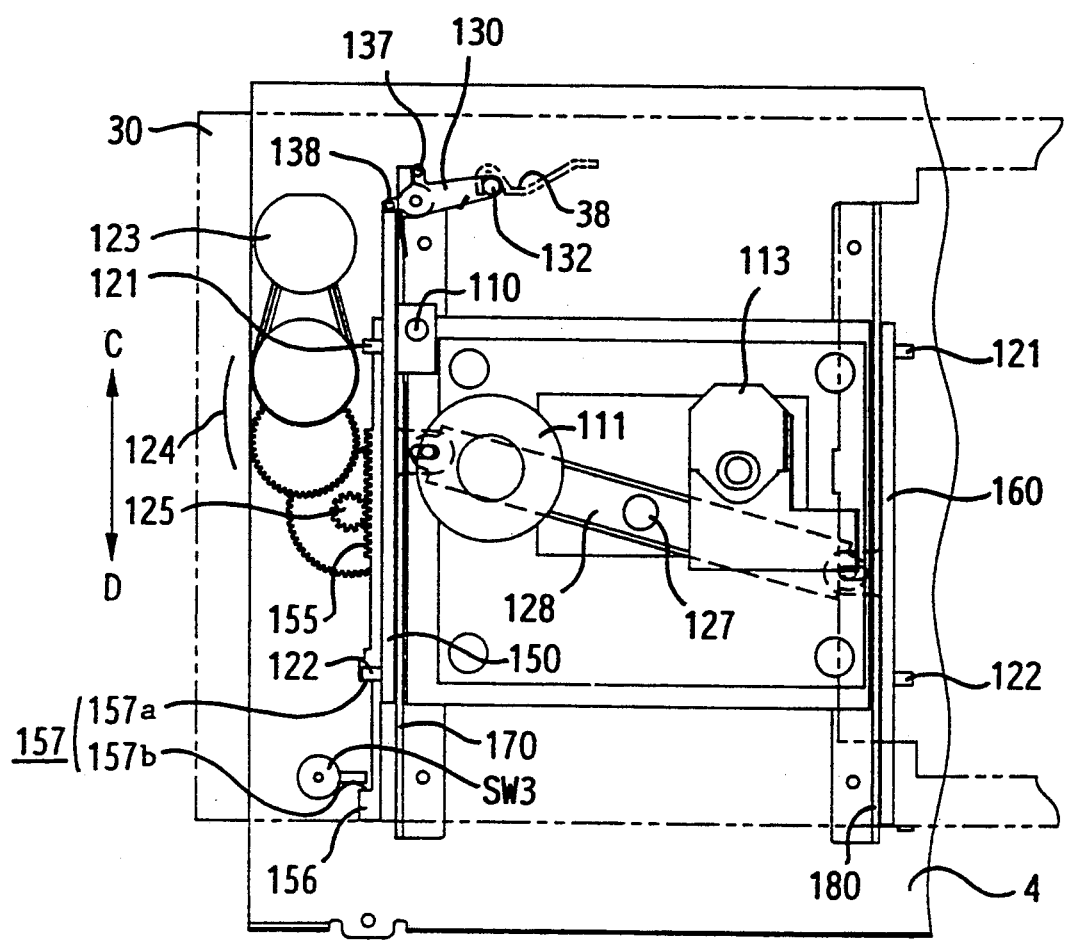
F I G. 4 (c)

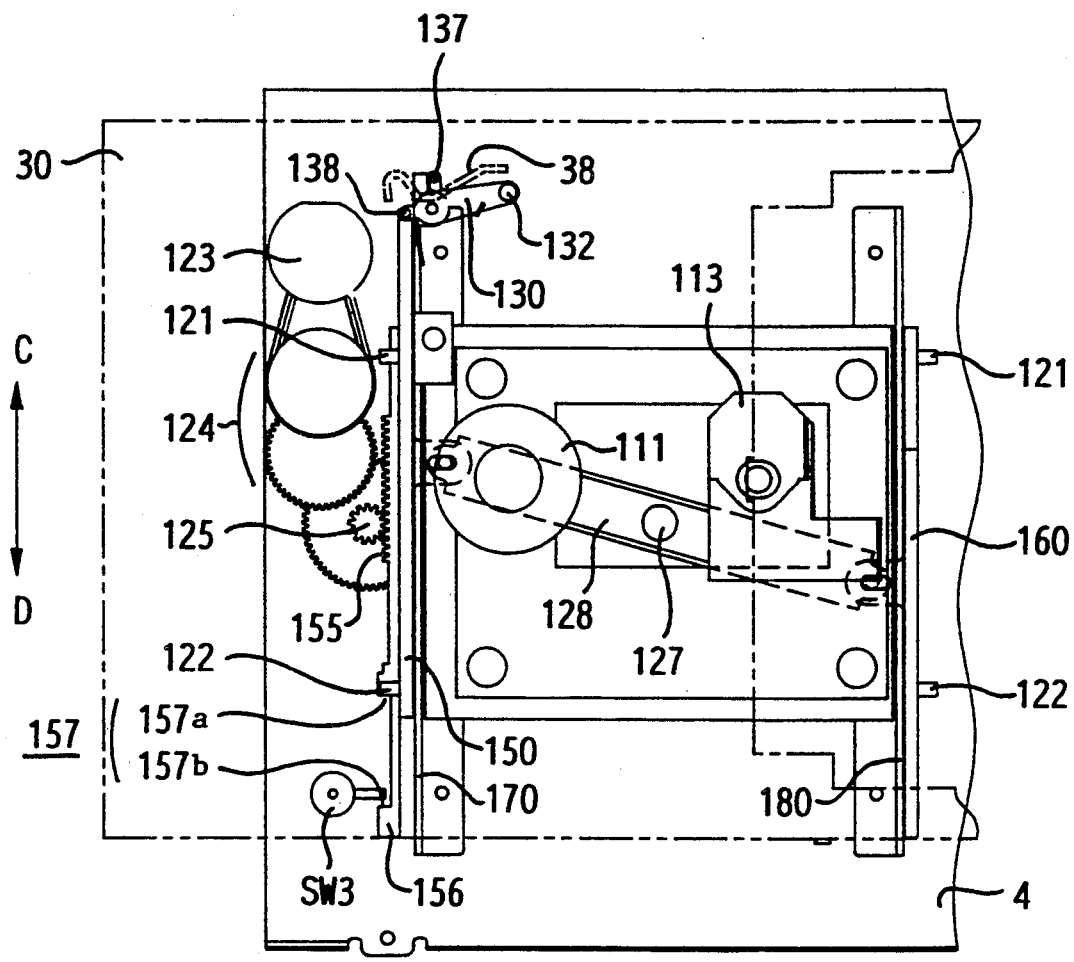
F I G. 7

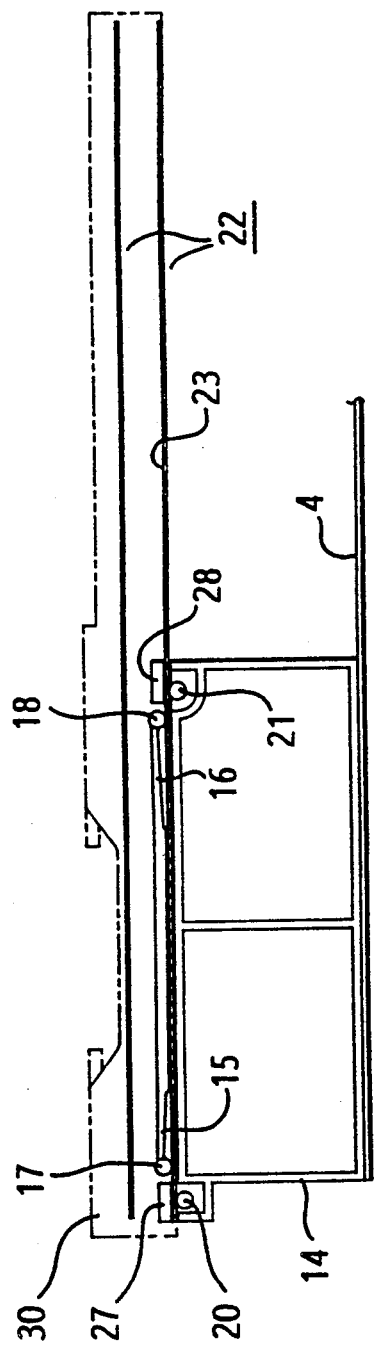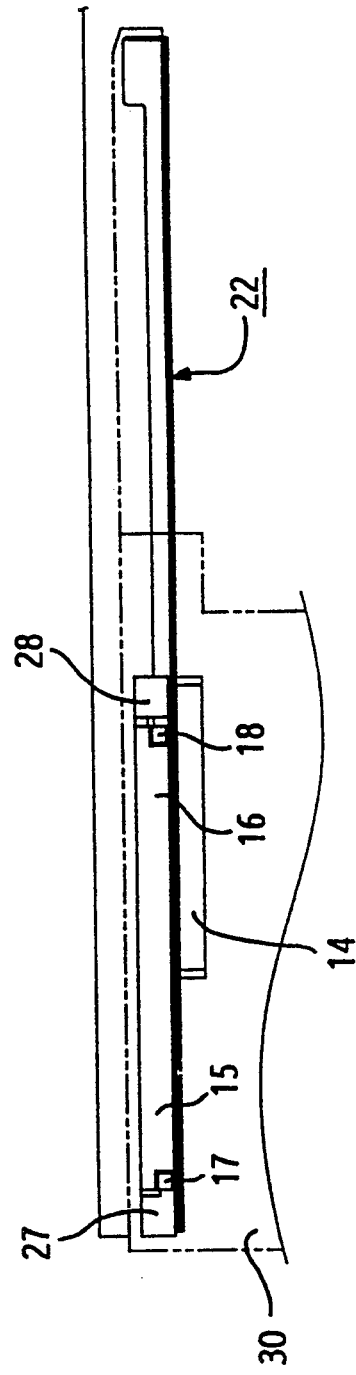

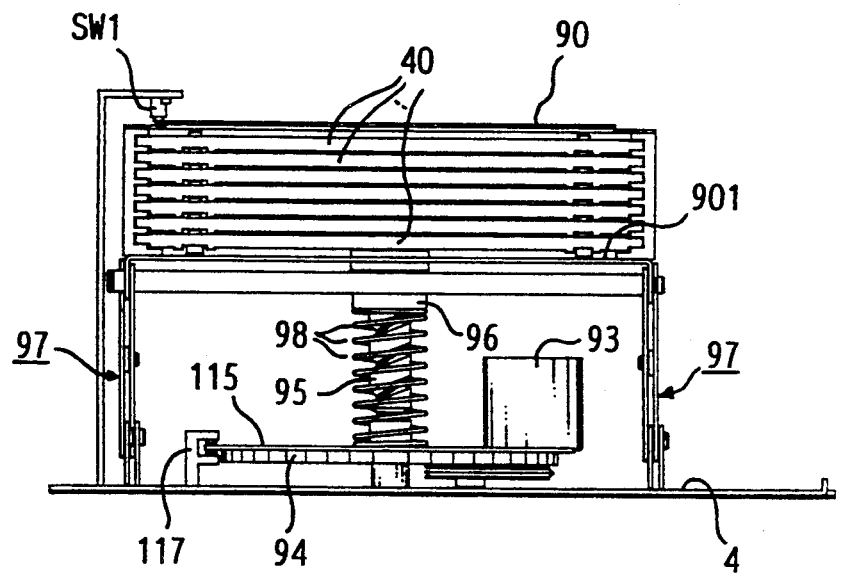
F I G. 10(a)
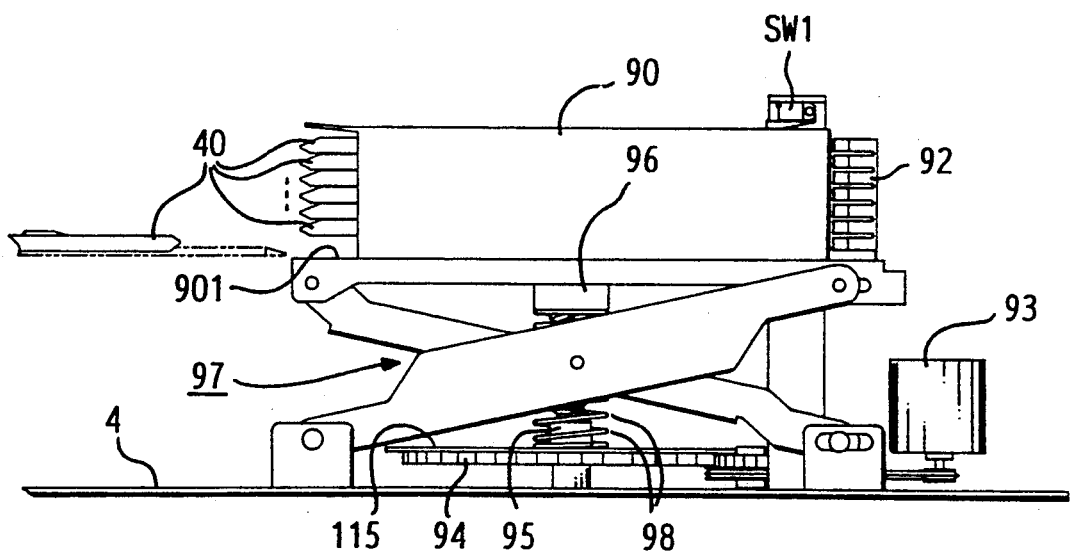
F I G. 10(b)

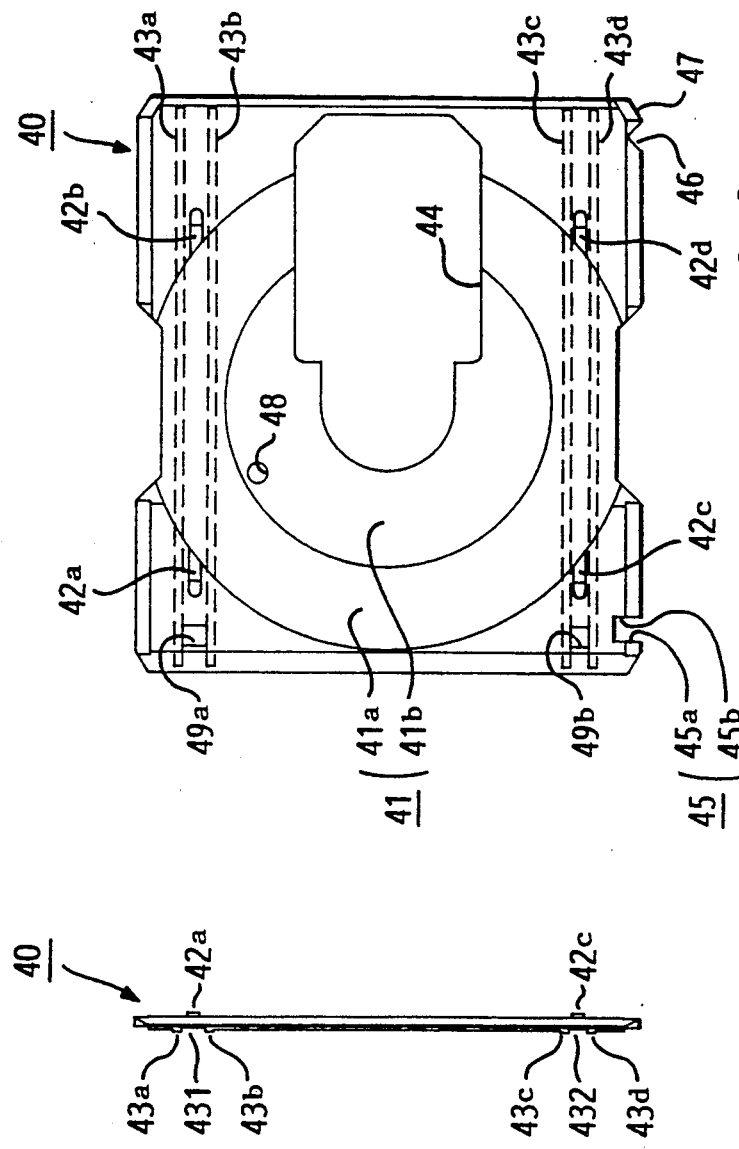

ELEVATION MECHANISM IN DISK PLAYER WITH DISK CHANGER FUNCTIONS INCLUDING AN ADJUSTABLE DRIVE NUT WHICH RAISES AND LOWERS DISCS

BACKGROUND OF THE INVENTION

1. Field of the Invention

The present invention relates to a disk player with disk changer functions, and more particularly to a drive mechanism or relative elevation of a disk-storage means in the disk player.

2. Description of the Prior Art

A disk player with disk changer functions is well known. The disk player of this type typically includes a removable stacker or magazine for storing a plurality of disks. In a position of the stacker installed in the disk player, a desired one of disks stored in the stacker may be transported to a disk-reading position in opposition to a disk-reading device.

Another type disk player with disk changer functions is disclosed in a co-pending application Ser. No. 07/572,050, filed Aug. 23, 1990, which comprises a nondetachable stacker for receiving a plurality of disks in a concentric array, a plurality of subframes each adapted to receive a disk and a single main frames adapted to receive one of the subframes. The main frame is movable between a disk-reading position inside the player and a disk-inserting/removing position outside the player. When the main frame stands in the disk-inserting/removing position, a disk may be inserted into or removed from the subframe received therein. This player allows a new disk to be read without necessity of removing the stacker.

In the conventional and above-referred updated disk player with disk changer functions, the stacker is mounted elevatably with respect to a disk-reading device for playback of the disk located in the disk-reading position, so that one of stairs in the stacker may be selected for playback or storage of the disk.

Japanese patent publication No. 124,154/1989 and No. 103,466/1988 disclose a similar arrangement of a mechanism for elevation of the disk-reading device relative to the stacker. In the mechanism disclosed, there is provided a plurality of cylindrical cams which are rotated by a drive gear mounted on a chassis, to move up and down the disk-reading device in engagement with elements thereof. This arrangement of the prior art mechanism requires that the cylindrical cams and the elements should be mounted at opposite sides of the disk-reading device, resulting in its dimension being considerably wider than the disk-reading device. This makes it difficult to minimize the overall size of the player. Further, it is not desirable to move the disk-reading device relative to a stationary stacker, since expected read-out of the disk would be affected due to a mechanically unavoidable instability of the mechanism for elevation of the disk-reading device.

The mechanism for relative movement of the stacker should meet a requirement that every stair in the stacker may be positioned just in flush with the plane of the disk located in the disk-reading position, to thereby ascertain smooth insertion of a new disk into a desired stair in the stacker or removal of a disused disk from a selective one of the stairs in the stacker. This is contemplated in one of the above-referred prior arts, Japanese patent publication No. 103,466/1988. More particularly, each cylindrical cam 16 has a plurality of unpitched screw sections 16b, one of which is adapted to engage, in every rotation of the cam, with the element 19 over a certain angular range of rotation. The stacker is to be stopped when the element 19 remains in one of the unpitched screw section 16b of the cylindrical cam 16. With this arrangement every stair in the stacker can surely be stopped in flush with the plane of the disk, even when an actual angular position in rotation of the cylindrical cams 16 should be somewhat offset due to poor accuracy in working of the drive gear 17, for example. However, in fact, manufacture of the cylindrical cams having such unique unpitched sections will be very difficult, which inevitably increase the overall costs of manufacture of the player.

SUMMARY OF THE INVENTION

It is an object of the invention to provide an improved mechanism for relative elevation between a disk-storage means and a disk-reading means in a the disk player with disk changer functions, capable of eliminating drawbacks of the prior arts.

In accordance with an aspect of the invention, there is provided a mechanism for elevation of a disk-storage means relative to a main body of a disk player having a disk-conveying device for conveying a disk between a first position wherein it is stored in one of stairs in the disk-storage means and a second position wherein it can be read by a disk-reading device, the mechanism comprising a driving source, a threaded shaft rotated by the driving source, and a nut movable together with the disk-storage means in engagement with the threaded shaft to move the disk-storage means in response to rotation of the threaded shaft.

In accordance with another aspect of the invention, there is provided a mechanism for elevation of a disk-storage means relative to a main body of a disk player having a disk-conveying device for conveying a disk between a first position wherein it is stored in one of stairs in the disk-storage means and a second position wherein it can be read by a disk-reading device, the mechanism comprising a driving source, a threaded shaft rotated by the driving source and having a smaller diameter than a central aperture of the disk to allow insertion thereof into the central aperture of the disk when the disk is in the first position, a nut movable together with the disk-storage means in engagement with the threaded shaft to move the disk-storage means in response to rotation of the threaded shaft, and guide means for maintaining parallel relation between the disk-storage means and the main body during movement of the disk-storage means.

In accordance with still another aspect of the invention, there is provided a mechanism for elevation of a disk-storage means relative to a main body of a disk player having a disk-conveying device for conveying a disk between a first position wherein it is stored in one of stairs in the disk-storage means and a second position wherein it can be read by a disk-reading device, the mechanism comprising a driving source, a threaded shaft rotated by the driving source, a nut movable together with the disk-storage means in engagement with the threaded shaft to move the disk-storage means in response to rotation of the threaded shaft, and adjusting means for adjustment of the fixed position of the nut to adjust its angular position relative to the threaded shaft.

BRIEF DESCRIPTION OF THE DRAWINGS

Further objects and advantages of this invention can be fully understood from the following detailed description when read in conjunction with the accompanying drawings in which:

FIG. 4(a), FIG. 4(b) and FIG. 4(c) are front view, side elevation and plan view particularly showing a lifting device for vertical movement of the mechanism unit, with the mechanism unit being in the standby position;

FIG. 7 is a plan view showing a standby position of the tray lock means;

FIG. 8(b) and FIG. 8(c) are cross sections taken along the lines b—b and c—c in FIG. 8(a), respectively.

FIG. 10(a), FIG. 10(b), FIG. 10(c) are front view, side elevation and plan view of a stacker and the lifting device therefor, with the stacker being lifted to its uppermost position;

FIG. 12(a), FIG. 12(b) and FIG. 12(c) are front view, side elevation and plan view of the carriage;

DETAILED DESCRIPTION OF THE EMBODIMENT

Figure 1A:
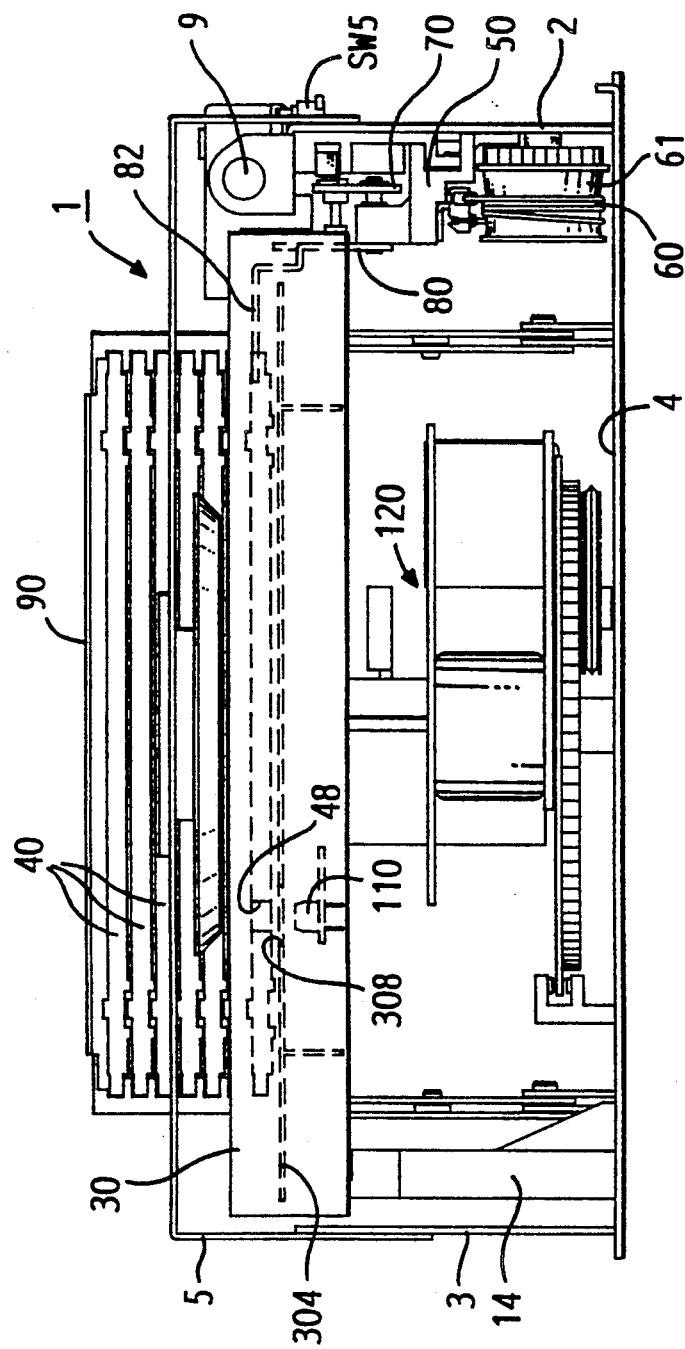
FIG. 1(a), FIG. 1(b) and FIG. 1(c) are front view, side elevation and plan view, respectively, of a compact disk (CD) player embodying the invention with a main frame or tray being in a loaded position and a disk-reading mechanism unit being lowered to its standby position.

A preferred embodiment of the invention will now be described in detail in reference to the accompanying drawings. The embodiment disclosed is designed as a so-called stacker-type CD player which provides disk changer functions for a selected one of disks received in a stacker, as well as normal playback operation for a single disk outside the stacker, general construction and arrangement of which is described in the co-pending application of U.S. Ser. No. 07/572,050.

Referring first to FIG. 1(a) to FIG. 1(d) and FIG. 2(a) and FIG. 2(b), a chassis 1 is framed by a bottom 4 and a pair of side panels 2 and 3 upstanding from opposite edges of bottom 4. To the inside of side panel 2 is fixed a shaft 9 extending in a direction in which a tray 30 is loaded and unloaded with respect to chassis 1. Shaft 9 extends through a guide bracket 31 fixed to a side peripheral of tray 30 to allow it to reciprocate in the loading/unloading direction. A guide rail 22 having a substantially U-shaped cross section is fixed to tray 30 and extends along the opposite side periphery thereof, which is displaceable with respect to a guide block 14 fixed to bottom 4 and extends along side panel 3.

Figure 1B:
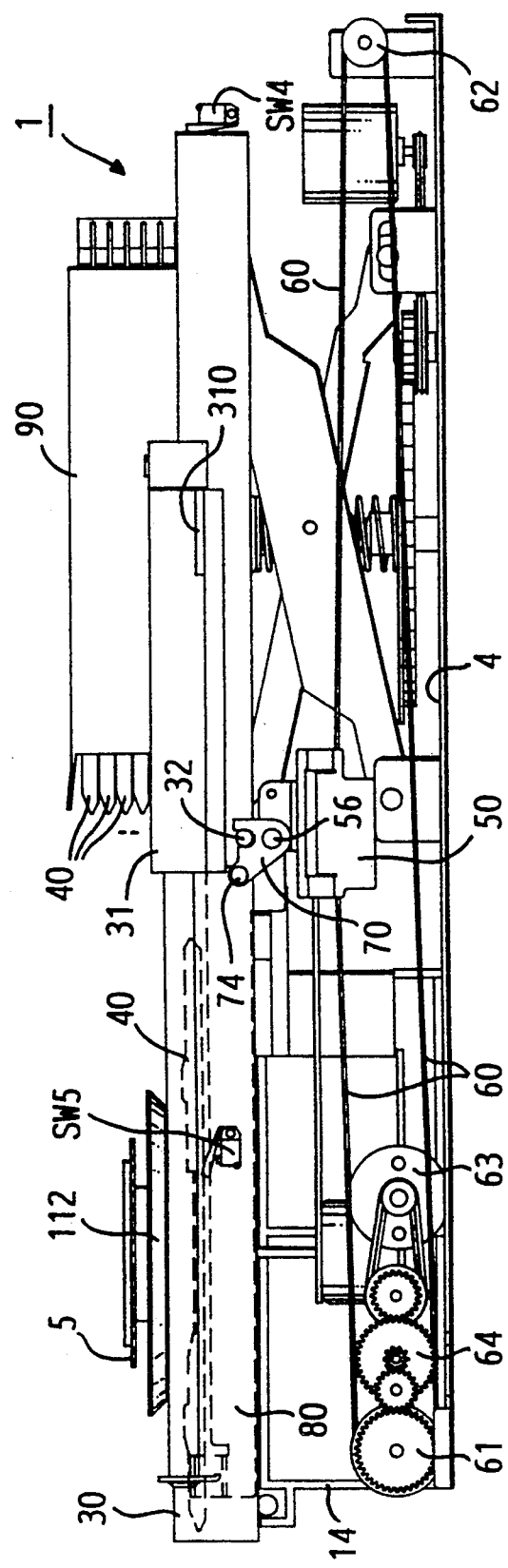
Figure 1C:
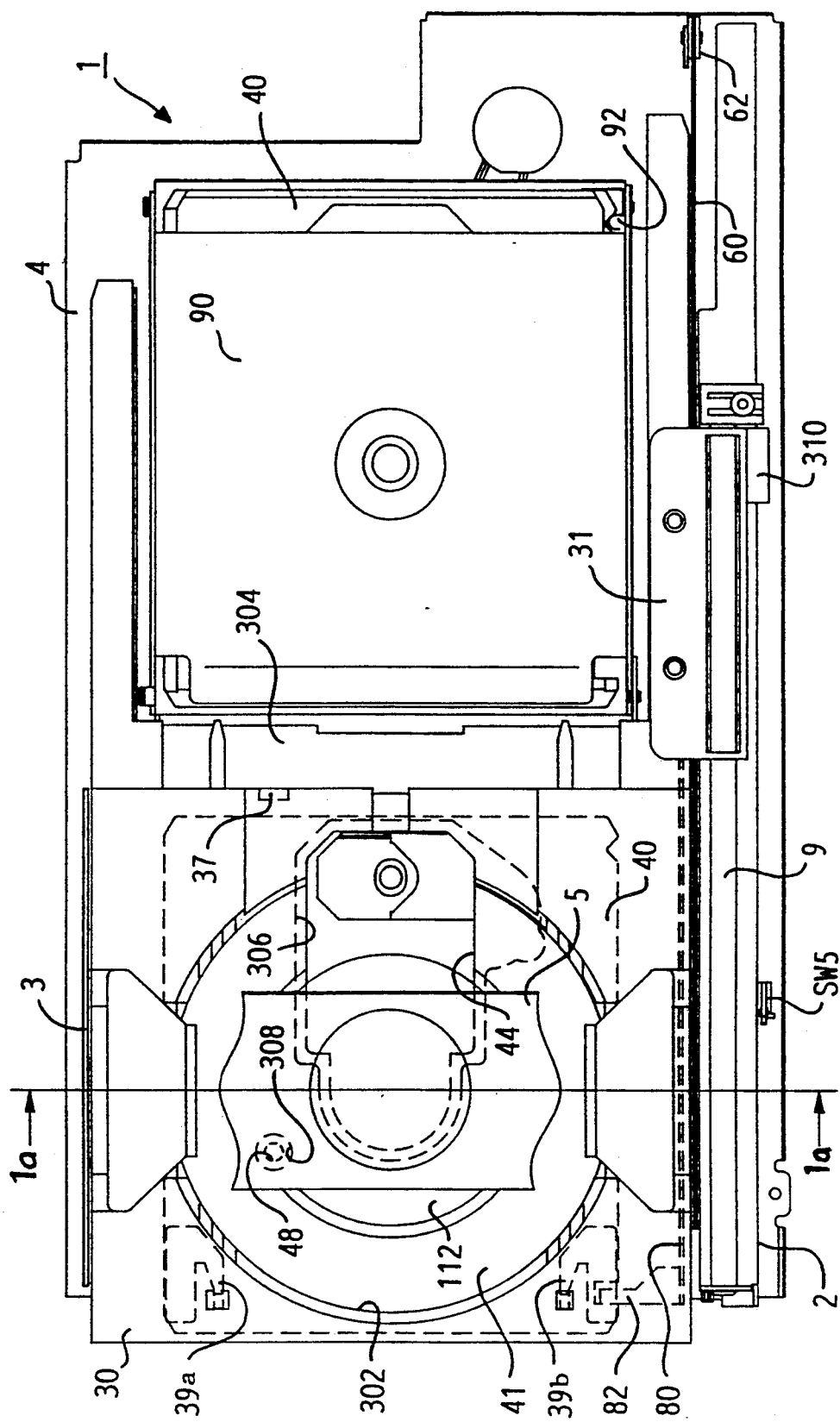
Figure 1D:
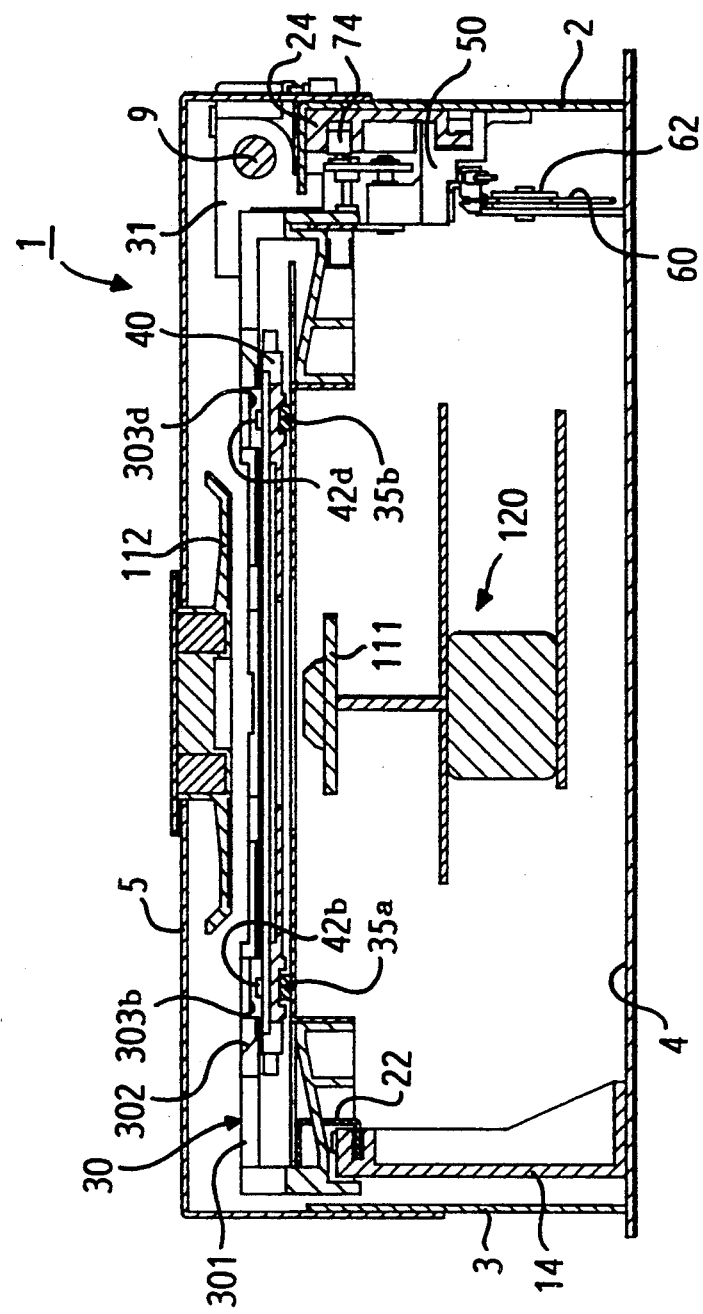
FIG. 1(d) is a cross section taken along the line a—a in FIG. 1(c)
Figure 2A:
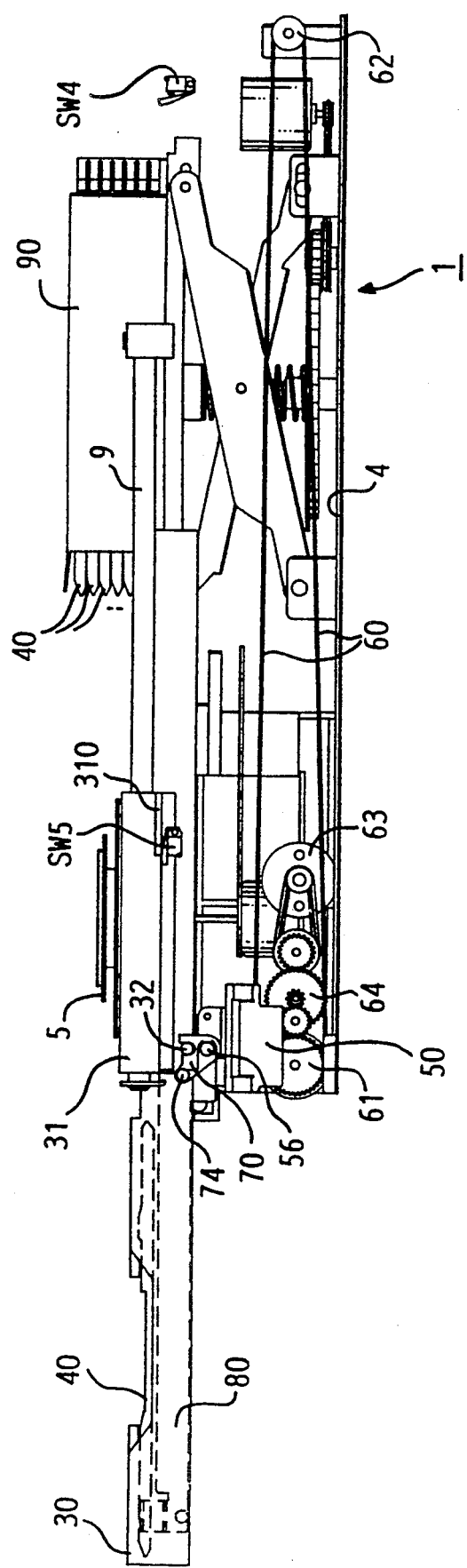
FIG. 2(a) and FIG. 2(b) are side elevation and plan view of the player with the tray being in an ejected position.
Figure 2B:
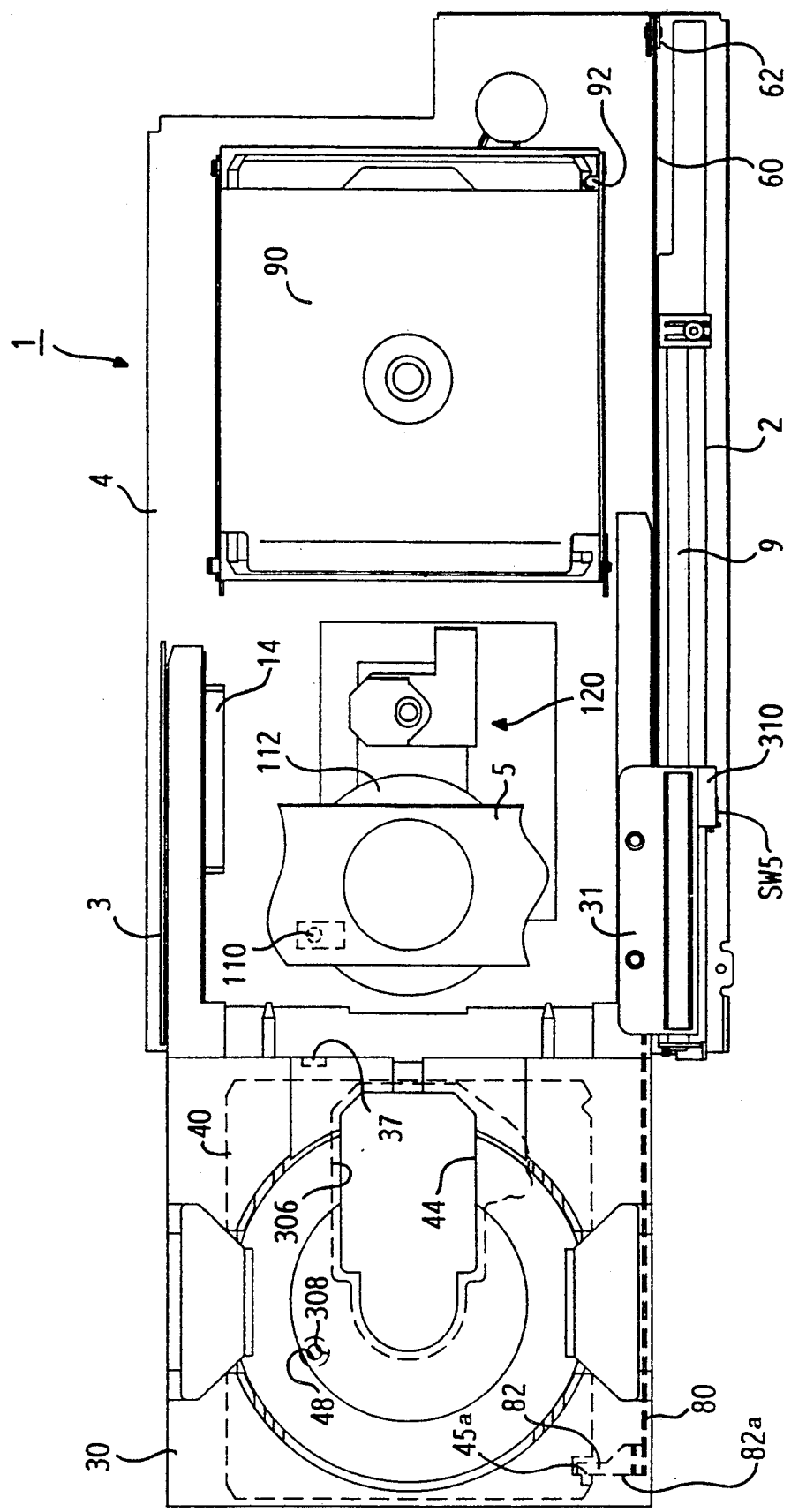

Thus, due to engagement between shaft 9 and guide bracket 31 at one side and engagement between guide block 14 and guide rail 22 at the other side, tray 30 is supported in chassis 1 slidably on a certain horizontal plane between an ejected position (FIG. 2(a) and FIG. 2(b)) in which it protrudes from chassis 1 to allow placement and/or removal of a disk and a loaded position (FIG. 1(b) and FIG. 1(c)) in which it is located within chassis 1 for playback of the disk mounted thereon.

It is noted that when in the ejected position, a major part of tray 30 protruding from chassis 1 is not directly supported means, as best seen in FIG. 2(b), resulting in its shaky movement and instability. This embodiment is, however, provided with means for minimizing such undesirable movement of tray 30.

Figure 8A:
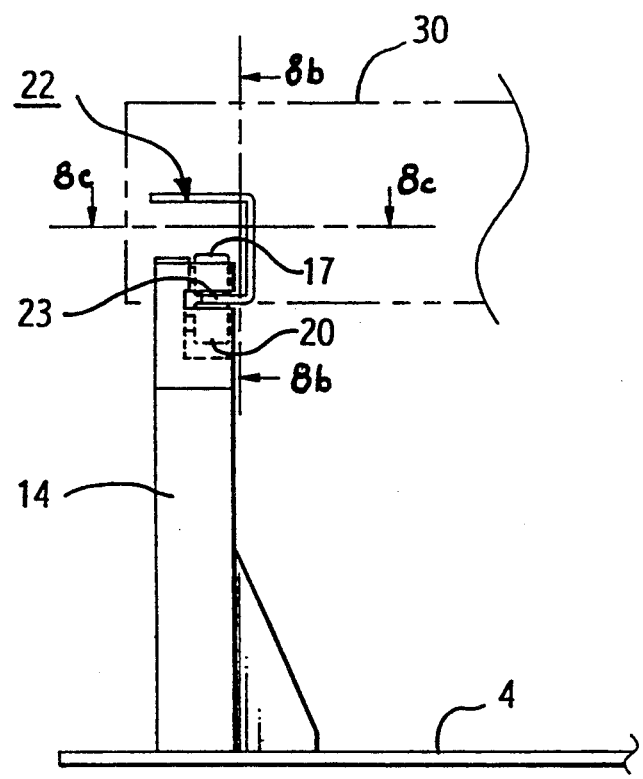
FIG. 8(a) is a front view, on an enlarged scale, of a tray loading device of the player.
Figure 8D:
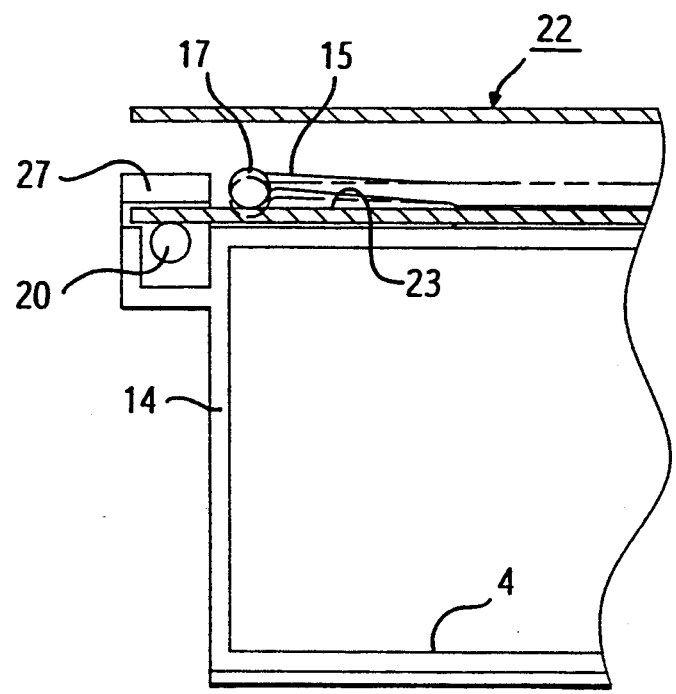
FIG. 8(d) is a still enlarged view of FIG. 8(b)

More particularly, referring specifically to FIG. 8a to FIG. 8c, a top portion of guide block 14 extends to form integrally a pair of inwardly extending flanges 27, 28. Just beneath flanges 27, 28 and in opposition thereto, guide block 14 is provided with a pair of lower guide rollers 20, 21. Further, a pair of flexible arms 15 and 16 are formed integrally with guide block 14 at a top thereof. Arm 16, which extends toward the tray loading direction, has a longer arm length than another arm 15 which, in turn, extends toward the tray ejecting direction. Upper guide rollers 17, 18 are rotatably connected to the free ends of arms 15, 16 respectively. As shown in FIG. 8(d), upper guide rollers 17, 18 will be by nature located in a position shown by double-dotted lines to provide a clearance from lower guide rollers 20, 21 somewhat smaller than the thickness of an outwardly extending bottom 23 of guide rail 22, but may be moved upwardly, due to flexibility of arms 15, 16, to allow insertion of bottom 23.

With such arrangement, bottom 23 of guide rail 22 is engaged with elastic contact between upper and lower guide rollers 17, 18 and 20, 21, while allowing smooth horizontal shift of tray 30. In this condition, bottom 23 is in no contact with flanges 27, 28 and there is provided a small gap therebetween. In the ejected position shown in FIG. 8(e). the shaky movement of tray 30 will substantially be prevented by elastic engagement of bottom 23 between upper and lower guide rollers.

Moreover, a difference in length of arms 15, 16 results in a difference in elastic force applied thereby, so that the shorter arm 15 will be in touch with bottom 23 of guide rail 22 with a greater force of elasticity. This also contributes toward preventing vertical displacement of tray, especially in the ejected position.

Figure 8E:
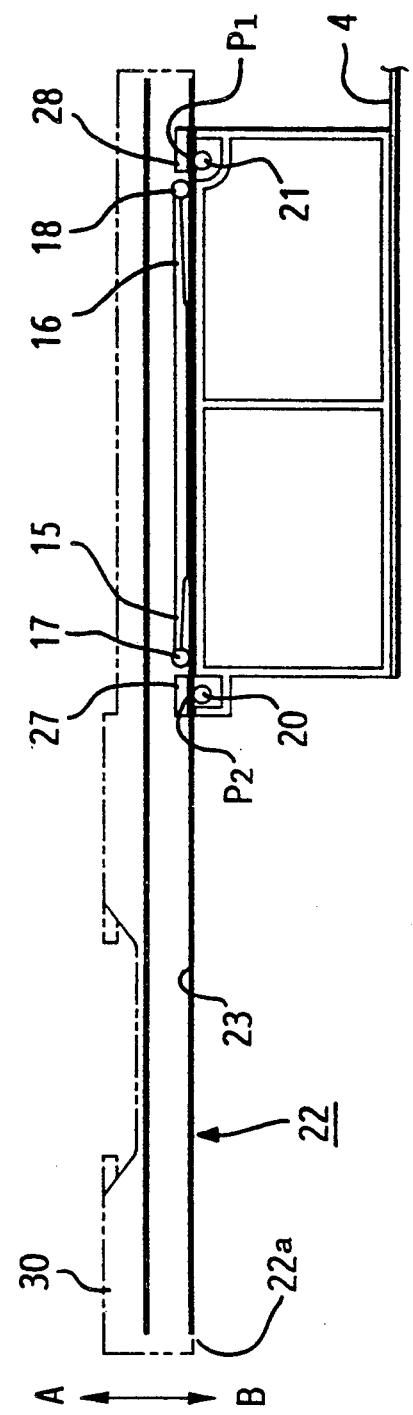
FIG. 8(e) is a cross section similar to FIG. 8(b), however, with the tray being in the ejected position.

More particularly, if some accidental force should be applied to a pullout end 22a of tray 30 in a direction of A in FIG. 8(e), tray 30 tends to rotate in the direction of A about an axis $P_1$ at which contact between bottom 23 of guide rail 22 and lower guide roller 21 may be made, whereas a contact line between bottom 23 and lower guide roller 20 becomes an axis $P_2$ of rotation of tray 30 in a direction of B. This means that A-directional rotation of tray 30 has a greater distance between the axis $P_1$ of rotation and tray end 22a than in B-directional rotation, which requires that rotation of tray 30 should be greatly restricted in the direction of A, rather than in the direction of B, so that vertical displacement of tray 30 be prevented in both directions A and B with substantially uniform effect.

Accordingly, it is essential that arm 15, which will in main give a downward force of elasticity to bottom 23 particularly when tray 30 is to rotate in the direction of A, should be arranged as a shorter arm to provide a greater effect of restriction to such rotation.

When tray 30 is shifted between the ejected position and the loaded position, it always carries a carriage 40 which is, in turn, adapted to carry a disk. Carriage 40 is movable together with tray 30 when mounted thereon. Moreover, carriage 40 may be retracted away from tray 30 in the loaded position to be installed in an elevatable stacker 90 mounted in the depths of chassis 1. Reciprocation of tray 30 between the loaded and ejected positions and reciprocation of carriage 40 between the in-tray position and the in-stacker position will be effected on the same horizontal plane by means of a shuttle 50 which is connected to a wire 60 to be reciprocated in the loading/unloading direction of tray 30.

Figure 9A:
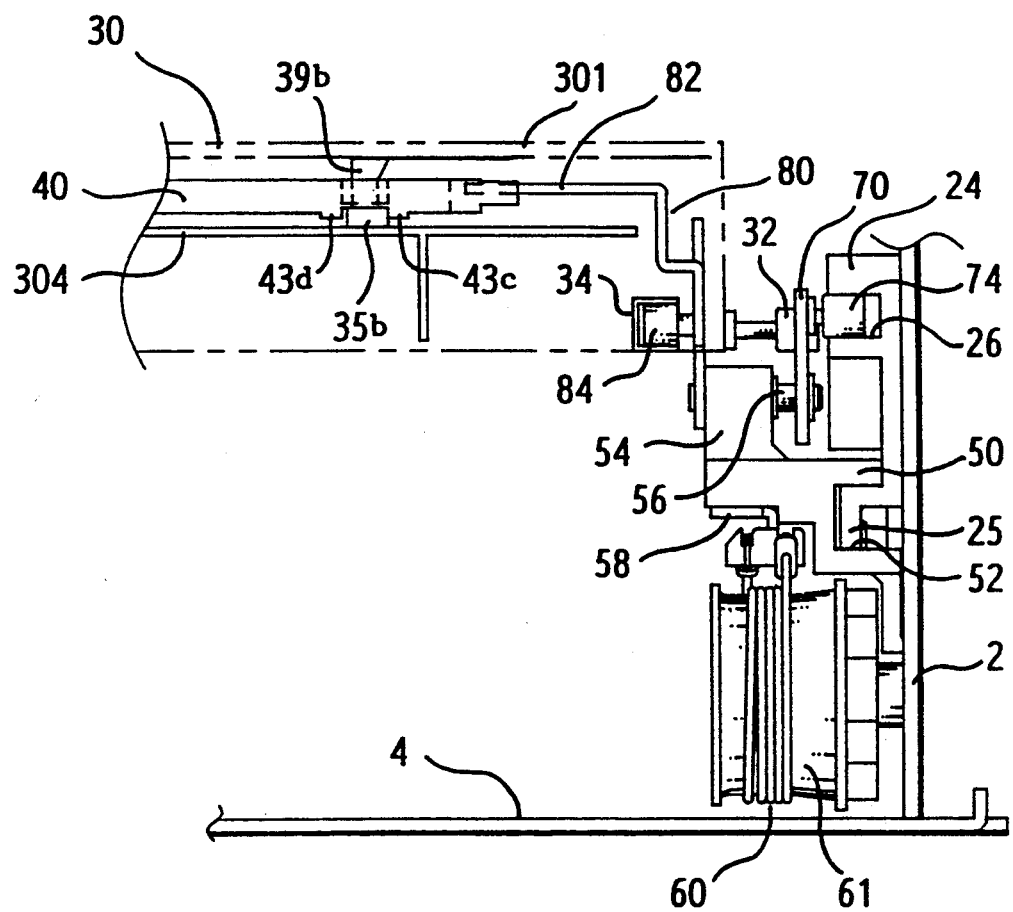
FIG. 9(a), FIG. 9(b) and FIG. 9(c) are front view on an enlarged scale, side elevation and plan view, showing details of a drive mechanism for driving the tray and the carriage.
Figure 9B:
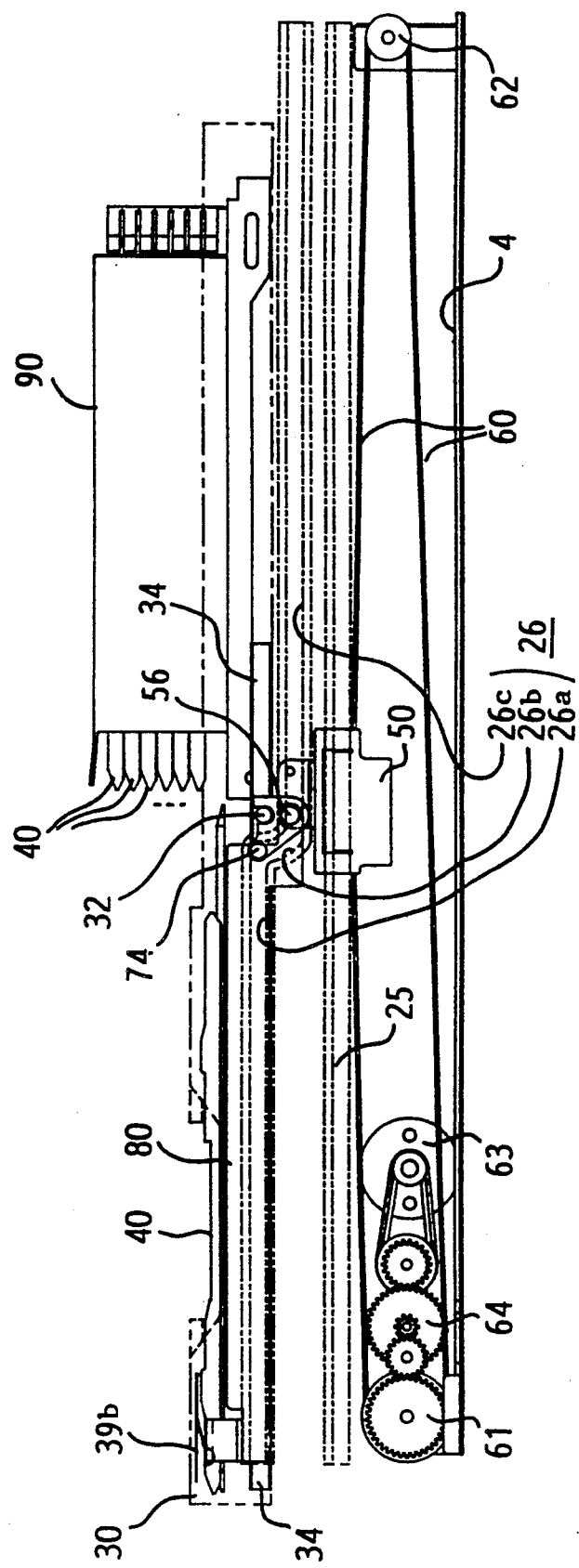
Figure 9C:
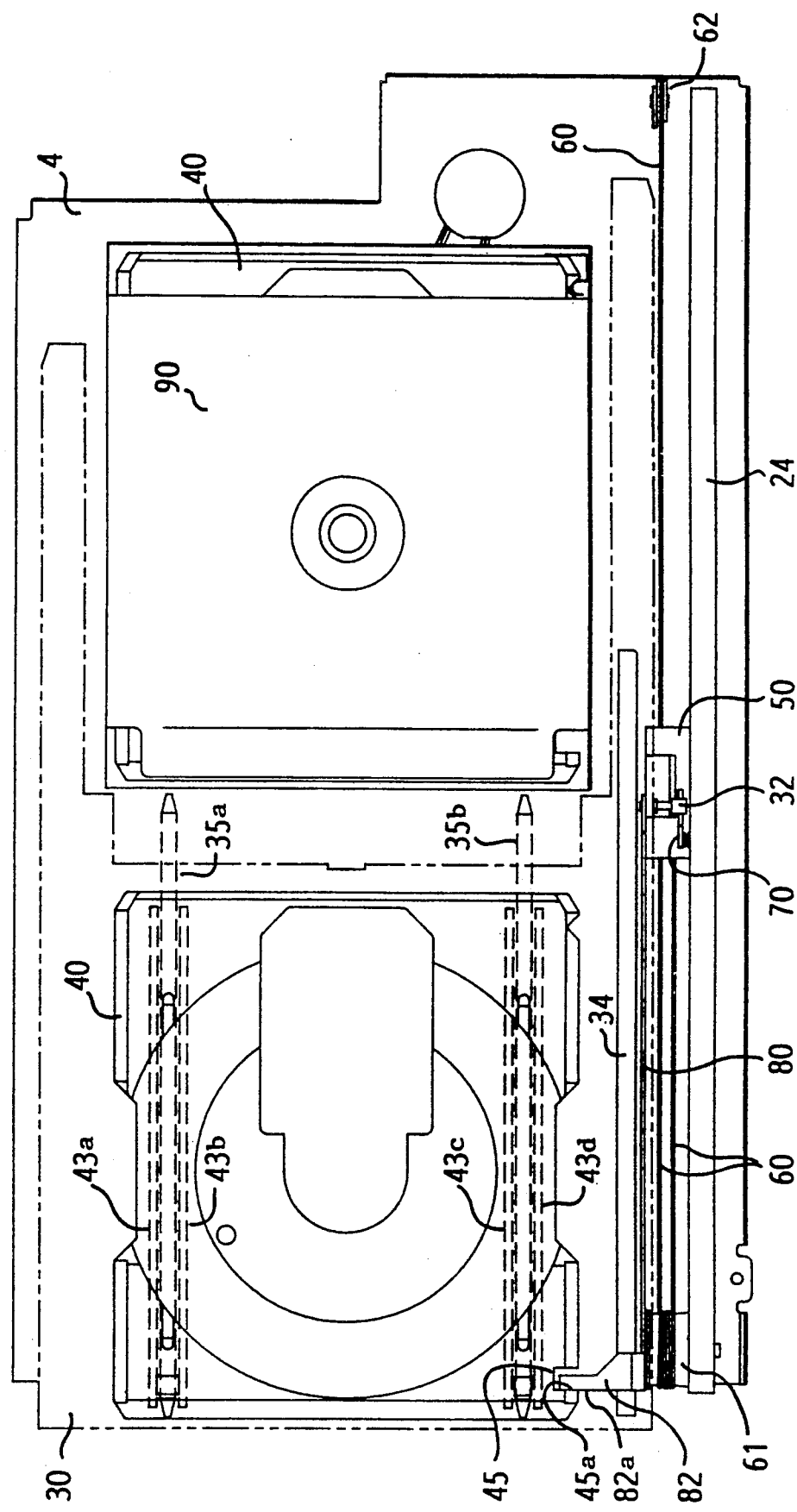
Figure 10C:
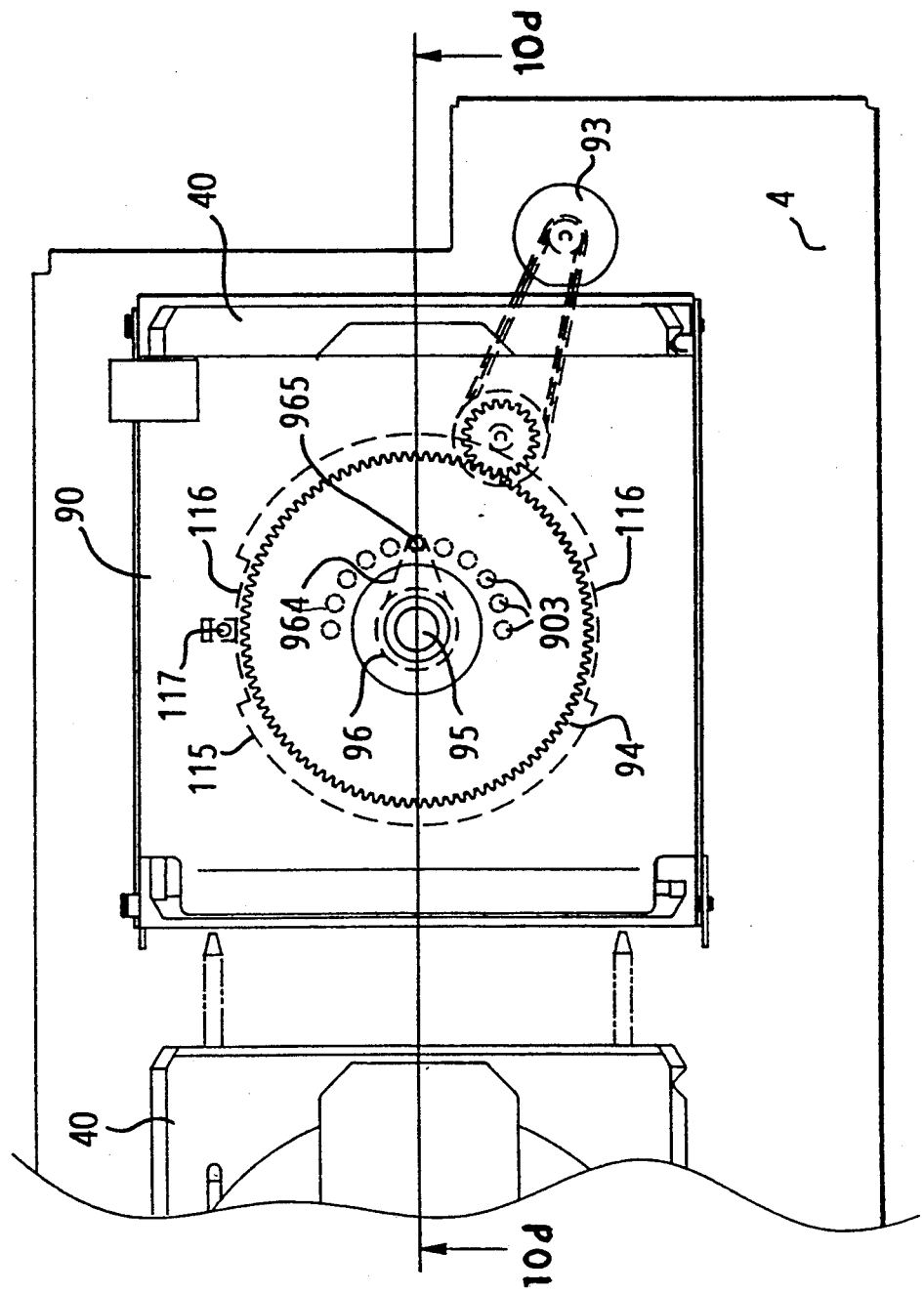
Figure 10D:
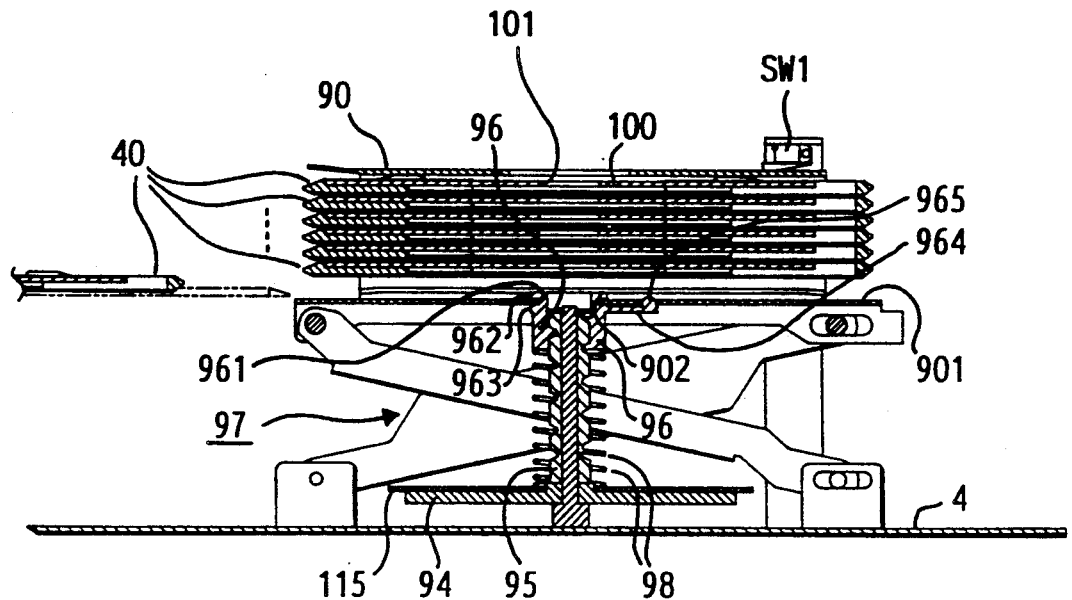
FIG. 10(d) is a cross section taken along the line d—d in FIG. 10(c)
Figure 10E:
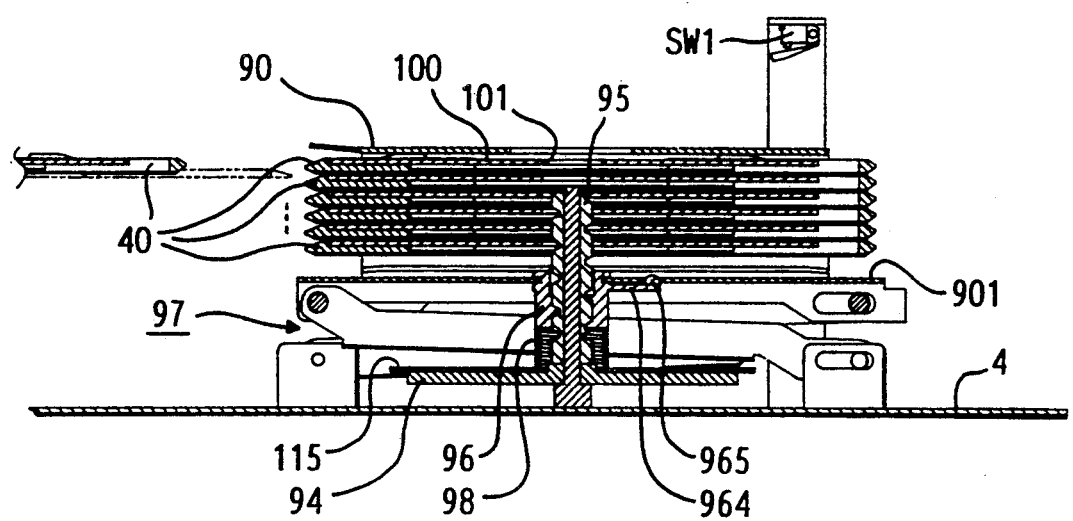
FIG. 10(e) is a cross section similar to FIG. 10(d), however, with the stacker being lowered to its lowermost position.

In particular reference to FIG. 9a through FIG. 9c, wire 60 is wound between a drive pulley 61 and a slave pulley 62, both arranged inside chassis 1 in a vicinity to side panel 2. Drive pulley 61 is driven by a motor 63 through a gearing 64 to be rotated at a desired speed determined by a drive control circuit 631. Shuttle 50 is connected to both ends of wire 60. An outer surface of shuttle 50 is provided with a lengthwise extending recess 52 for receiving a guide rail 25 which protrudes inwardly from side panel 2 over the entire length thereof and extends in the loading/unloading direction of tray 30, so that shuttle 50 may be horizontally reciprocated substantially between pulleys 61 and 62 along with rotating movement of wire 60.

A pivot pin 56 extends through an upstanding wall 54 of shuttle 50. A tray lock arm 70 is pivottaly connected to one side of pin 56. A carriage lock arm 80 is fixedly connected to the opposite side of pin 56. Tray lock arm 70 has a recess 72 adapted to engage a lock pin 32 projecting outwardly from the side of tray 30, and a guide pin 74 engageable within an upper guide groove 26 substantially extending in parallel with guide rail 25. As best seen in FIG. 9(b), upper guide groove 26 comprises a first horizontal section 26a and a second horizontal section 26c of a lower level, and an interconnecting oblique section 26b.

In advance of explanation of carriage lock arm 80, carriage 40 itself, together with associated portions of tray 30, will be described in reference to FIG. 12(a) to FIG. 12(c) and FIG. 1(a) to FIG. 1(d). On a carriage 40 there is defined a circular disk mount area 41 for mounting thereon the disk. Projections 42a through 42d will act as stop means for proper location of the disk.

A top 301 of tray 30 is provided with a corresponding circular opening 302, which is opposed to disk mount area 41 when carriage 40 is carried by tray 30. An underside of top 301 of tray 30 has a pair of aligned split grooves 303a, 303b and 303c, 303d, which prevent projections 42a–42d of carriage 40 from contacting with tray 30 during relative movement between tray 30 and carriage 40.

Along opposite side peripheries of a backside of carriage 40, there are respectively provided a pair of projecting rails 43a, 43b and 43c, 43d extending in the loading/unloading direction. Projections 42a, 42b and 42c, 42d of a downstairs carriage 40 in stacker 90 can be accommodated, without any contact thereto, in grooves 431, 432 defined between projecting rail pairs 43a, 43b and 43c, 43d of an upstairs carriage 40. Grooves 431. 432 will also receive projecting rails 35a, 35b on a bottom 304 of tray 30.

A pair of recesses 49a, 49b are formed on carriage 40 near the unloading end thereof, for engaging downwardly biased springs 39a, 39b (FIG. 9(a) to FIG. 9(c)) connected to the underside of top 301 of tray 30.

Carriage 40 used in this embodiment is adapted to carry two different types of disks which are commercially available at present. Thus, disk mount area 41 comprises a larger area 41a for a disk of 12 cm diameter and a smaller area 41b for another type of disk having a diameter of 8 cm. Smaller area 41 includes a pit 48 which is positioned in opposition to a pit 308 formed in bottom 304 of tray 30 when it carries carriage 40.

Large-dimensional openings 44 and 306 are respectively formed in carriage 40 and tray bottom 304, through which optical reading mechanism (not shown) can make access to the disk placed in disk mount area 41 for playback. A recess 45 is formed near the unloading end of one side periphery of carriage 40 for engagement with a leading end 82 of carriage lock arm 80. Near the loading end of carriage 40, the same side periphery thereof is cut out to form a notch 46 for engagement of a spring 92 to be described later. Opposite ends of carriage 80 in the loading and unloading directions are tapered downwardly to facilitate smooth insertion to stacker 90.

Referring again to FIG. 9(a) to FIG. 9(c), carriage lock arm 80 extend substantially over the entire length of tray 30. The upstanding end of carriage lock arm 80 is bent inwardly to form an operating end 82 protruded into recess 45 of an in-tray carriage 40. Operating end 82 has a dimension in the loading/unloading direction somewhat smaller than a corresponding dimension of recess 45. In the loading position of tray 30 shown in FIG. 9(a) to FIG. 9(c), an unloading-side edge 82a of operating end 82 is being in contact with an unloading-side wall 45a of recess 45. Below operating end 82, a guide pin 84 protrudes inwardly from carriage lock arm 80 to be engaged within a horizontally extending guide groove 34 formed in a side wall of tray 30.

Let us suppose that tray 30 is in the loaded position shown in FIG. 1(a) to FIG. 1(c) and FIG. 9(a) to FIG. 9(c) in which the disk mounted on the in-tray carriage 40 can be read for playback operation. Where the operator wants to exchange the in-carriage disk for another one to be now read, or to mount a new disk on carriage 40 which has actually carried no disk, tray 30, together with carriage 40 mounted thereon, are shifted to the ejected position shown in FIG. 2(a) and FIG. 2(b), by driving wire 60 in a counter-clockwise direction to thereby advance shuttle 50 toward drive pulley 61. During horizontal shift of shuttle 50 which is effected through engagement between recess 52 of shuttle 50 and horizontal rail 25 of guide rail 24, tray 30 carrying carriage 40 is moved by engagement of lock pin 32 thereof with recess 72 of tray lock arm 70. When shuttle 50 reaches the leftmost position close to drive pulley 61, tray ejecting operation has been completed and tray 30 will now be in the ejected position.

As having been described in reference to FIG. 8(a) to FIG. 8(e), since guide rail 22 provided at one side of tray 30 is held between guide rollers 17, 20 and 18, 21 which apply elastic forces to guide rail 22 from the opposite sides thereof, tray 30 will travel on a definitely horizontal plane without any tottering action. While tray 30 is being shifted from the loaded position to the ejected position, there is obtained continuous engagement between guide pin 74 projecting from tray lock arm 70 and first horizontal section 26a of guide groove 26, thereby maintaining a specific angular position of tray lock arm 70 shown in FIG. 9(a) to FIG. 9(c).

The in-tray carriage 40 will be moved along with tray 30 because of lock springs 39a, 39b protruding into recesses 49a, 49b and continuous contact between unloading-side edge 82a of operating end 82 and unloading-side wall 45a of recess 45.

From the foregoing description concerning movement of tray 30 from the loaded position to the ejected position, it will be understood that tray 30 is moved from the ejected position to the loaded position in a like manner but in the opposite direction. When tray 30 reaches the loaded position, it is detected by a switch SW4 mounted in chassis 1 (FIG. 1(b), FIG. 2(a)), an output thereof is supplied to a main control circuit 6 (FIG. 19) to be described later.

Carriage 40 mounted on tray 30 in the loaded position can be separated away from tray 30 to be received in a vacant stair of stacker 90, by driving wire 60 to further move shuttle 50 from the intermediate position particularly shown in FIG. 9(b) to the rightmost position.

More particularly, when shuttle 50 starts moving from the intermediate position of FIG. 9(b) toward slave pulley 62, guide pin 74 which has been positioned in an extreme end of first horizontal section 26a will now enter oblique section 26b, so that tray lock arm 70 is rotated about pin 56 in the counter-clockwise direction. As a result, as shown in FIG. 14(a), lock pin 32 is disengaged from recess 72 to make inoperable tray lock arm 70, which keeps tray 30 in the loaded position irrespective of further movement of shuttle 50 from the intermediate position of FIG. 9(a) toward slave pulley 62.

Figure 14A:
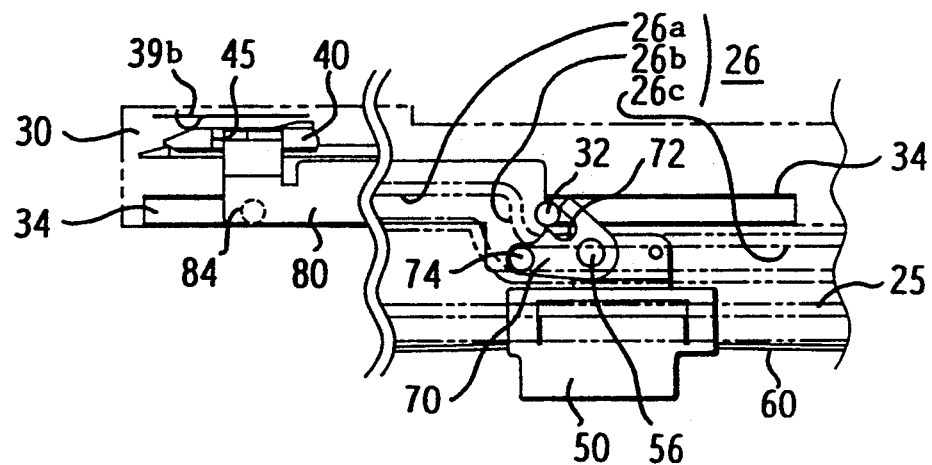
FIG. 14(a) and FIG. 14(b) are partial side elevation and plan view of the drive mechanism with a tray lock arm being disengaged from the tray in the loaded position.

The angular position of tray lock arm 70 shown in FIG. 14(a) remains unchanged, while guide pin 74 is being guided along second horizontal section 26c of guide groove 26 during further movement of shuttle 50.

On the contrary, carriage lock arm 80 will be still operable since engagement is now established between a loading-side edge 82b of operating end 82 thereof and a loading-side wall 45b of recess 45, which overcomes the biasing force of lock springs 39a, 39b to thereby move carriage 40 alone. When shuttle 50 reaches the rightmost position shown in FIG. 3(a) and FIG. 3(b), carriage 40 is received in a vacant stair (the lowermost stair in a disclosed example) instacker 90. Rails 35a, 35b formed on bottom 30d of tray 30, which project into grooves 431, 432 formed on the underside of carriage 40, will guide carriage 40 to be conveyed on a definite horizontal plane during movement of shuttle 50 between the intermediate and the rightmost positions.

Figure 3A:
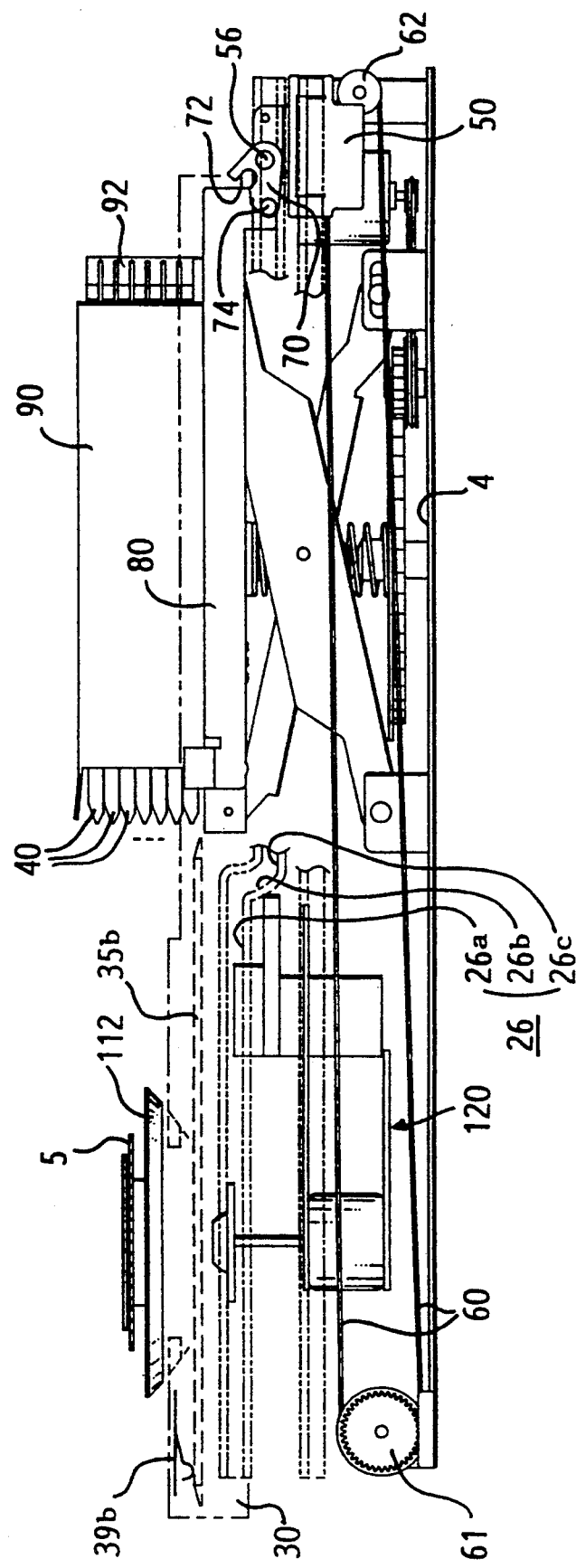
FIG. 3(a) and FIG. 3(b) are side elevation and plan view of the player with all of subtrays or carriages being received in a stacker.
Figure 3B:
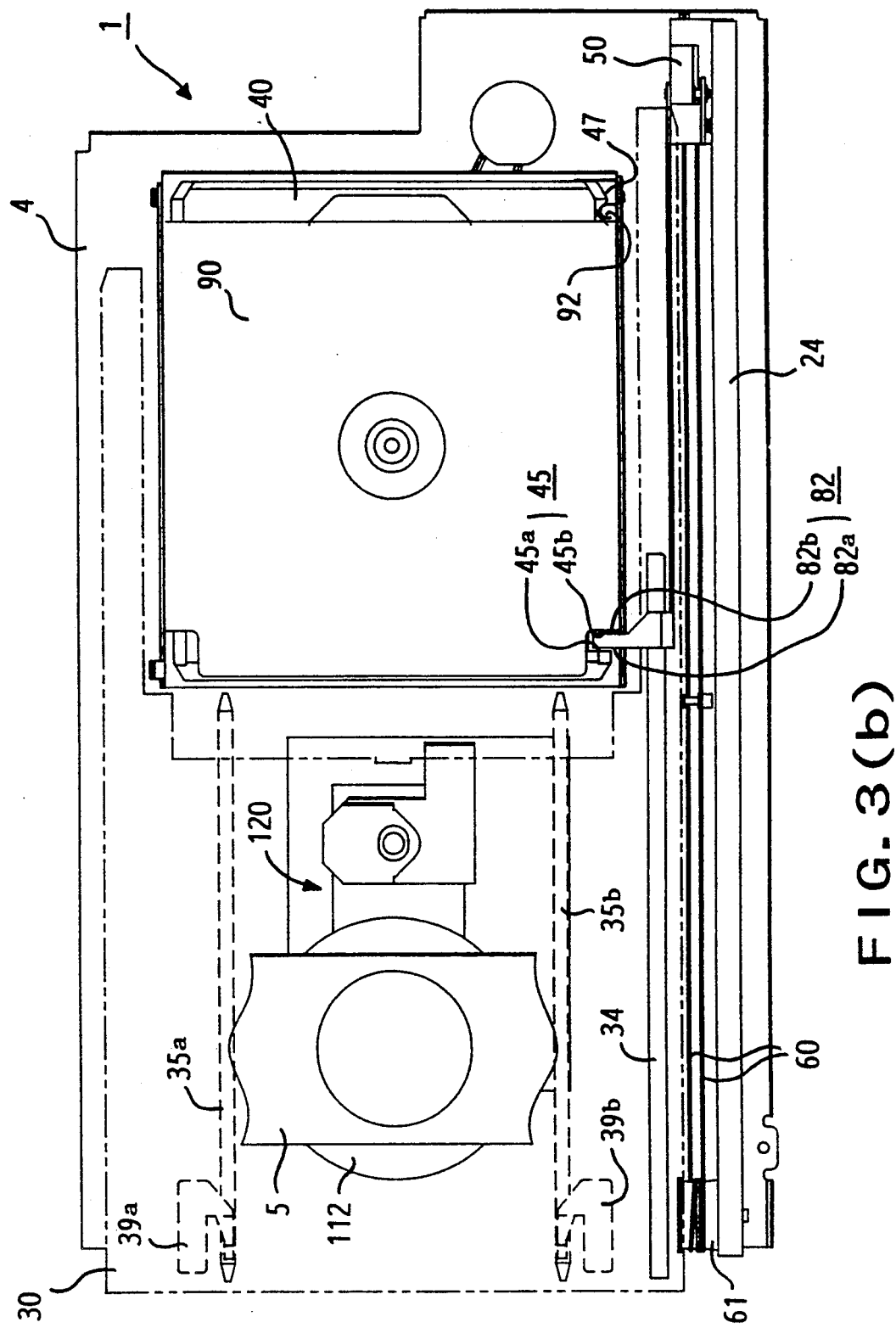

FIG. 3(a) and FIG. 3(b) show that carriage 40 is completely received in stacker 90 on a vacant lowermost stair. As best seen in FIG. 3(b), when carriage 40 is in the in-stacker position, operating end 82 of carriage lock arm 80 protrudes into recess 45 of carriage, but in no direct contact therewith. This is established by a spring assembly 92 provided at a deep corner of stacker 90 and including a plurality of leaf springs corresponding to the respective stairs adapted to receive the carriages.

More particularly, when shuttle 50 is moved toward slave pulley 62 to be positioned in close vicinity to the rightmost position, the loading-side end corner of the advancing carriage 40 will become in contact with one of the leaf springs of assembly 92, which is therefore deformed to be oriented outwardly.

The next moment shuttle 50 reaches the rightmost position, and at the same time, a ridge 47 defining notch 46 has just climbed over the apex of the leaf spring. By restoration of the leaf spring, carriage 40 is further advanced in a some additional amount to release contact between operating end 82 and recess 45 and retained in the in stacker position. The in-stacker carriage 40 remains in no contact with shuttle 50, which facilitates elevating movement of stacker 90.

Carriage 40 installed in stacker 90 may be conveyed to the in-tray position in a like manner, but in the opposite direction. When shuttle 50 residing in the rightmost position of FIG. 3(a) and FIG. 3(b) starts moving in the unloading direction, unloading-side edge 82a of operating end 82 of carriage lock arm 80 is engaged with unloading-side wall 45a of recess 45, thereby pushing carriage 40 in the same direction. When carriage 40 reaches the in-tray position, shown in FIG. 9(a) to FIG. 9(c) in which it is mounted on tray 30 remaining in the loaded position, it is retained in this position by engagement between lock springs 39a, 39b and recesses 49a, 49b.

Figure 14B:
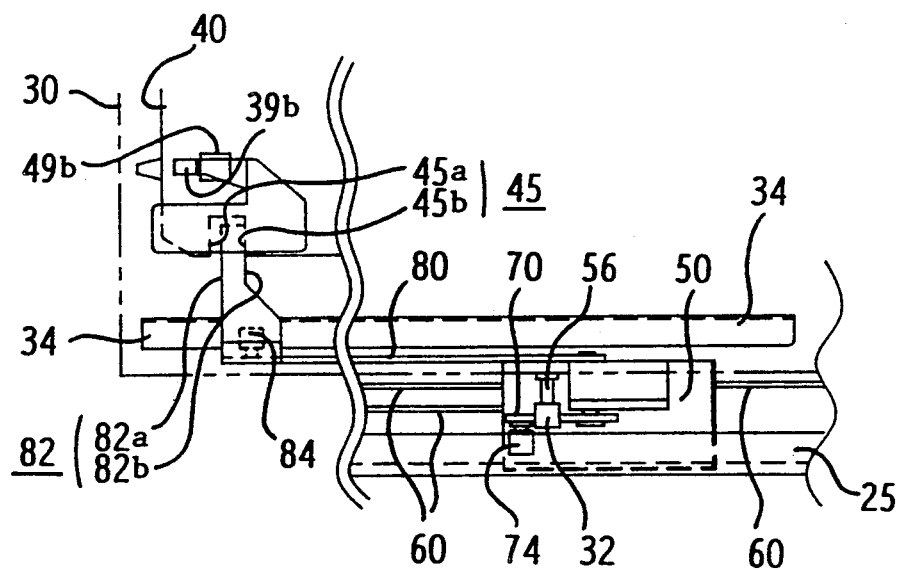

Meanwhile, immediately after passing through the position of FIG. 14(a) and FIG. 14(b), lock pin 32 is engaged within recess 72 and guide pin 74 is guided along oblique section 26b of guide groove 26. Tray lock arm 70 is thus rotated in the clockwise direction to become in the angular position shown in FIG. 9(a) to FIG. 9(c), so that tray 30 becomes under restraint.

Figure 11A:
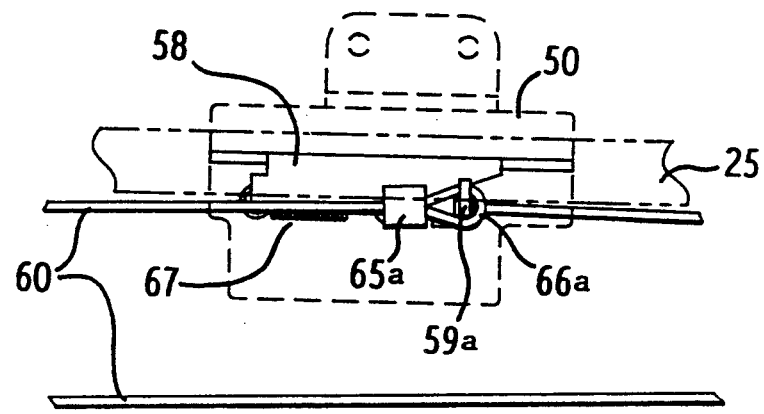
FIG. 11(a) and FIG. 11(b) are enlarged views of a shuttle and parts associated thereto in the drive mechanism.
Figure 11B:
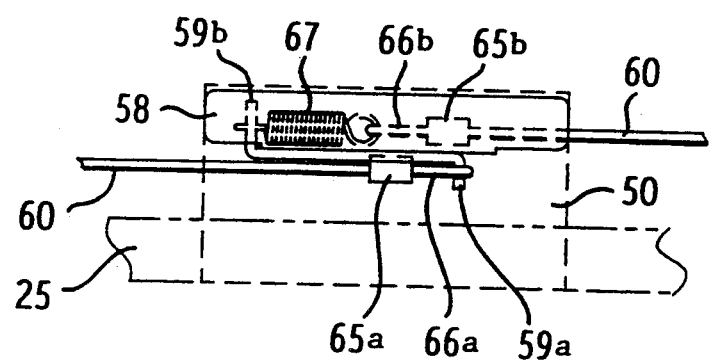

In this embodiment, shuttle 50 is connected to wire 60 in such manner as shown in FIG. 11(a) and FIG. 11(b). One end of wire 60 extending from drive pulley 61 is tied up by a first clamp device 65a to form a first ring 66a. Likewise, a second ring 66b is formed by a second clamp device 65b at the other end of wire 60. An engaging member 58 fixedly mounted in shuttle 50 is provided with first and second latches 59a, 59b at opposite ends thereof. First ring 66a is engaged by first latch 59a arranged on the side of slave pulley 62, whereas second ring 66b is connected by a tension spring 67 to second latch 59b arranged on the side of drive pulley 61, so that wire 60 is connected to shuttle 50 at both ends crossing like substantially X-shape. First and second rings 66a, 66b, clamp devices 65a, 65b and tension spring 67 are all arranged inside shuttle 50 and have no part protruding from shuttle 50.

Guide rail 25 extends horizontally with a sufficient clearance from drive and slave pulleys 61, 62, which allows engaging member 58 to be positioned substantially above pulleys 61, 62.

Figure 11C:
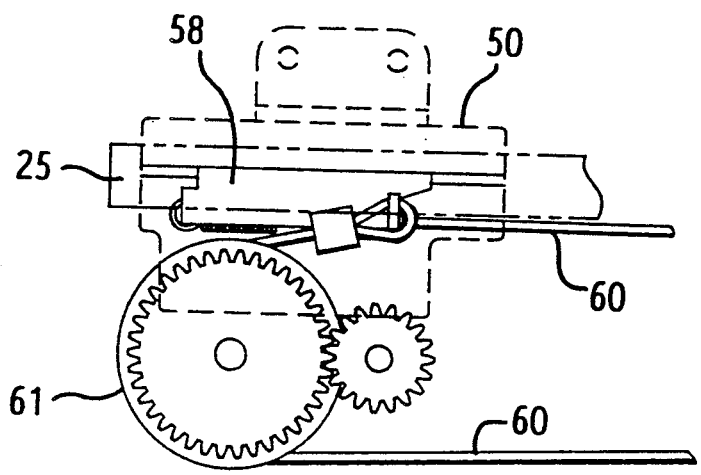
FIG. 11(c) and FIG. 11(d) are enlarged views showing extreme positions of the shuttle.
Figure 11D:
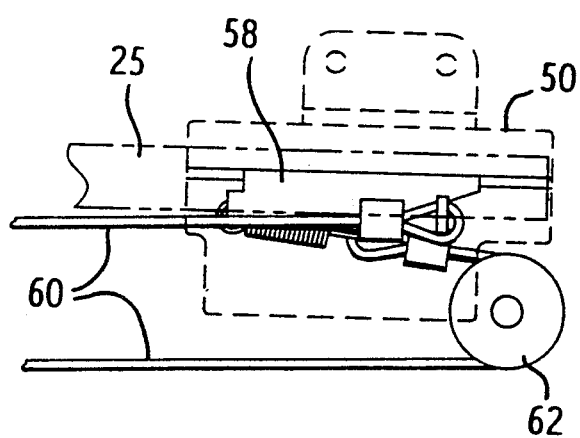
Figure 13:
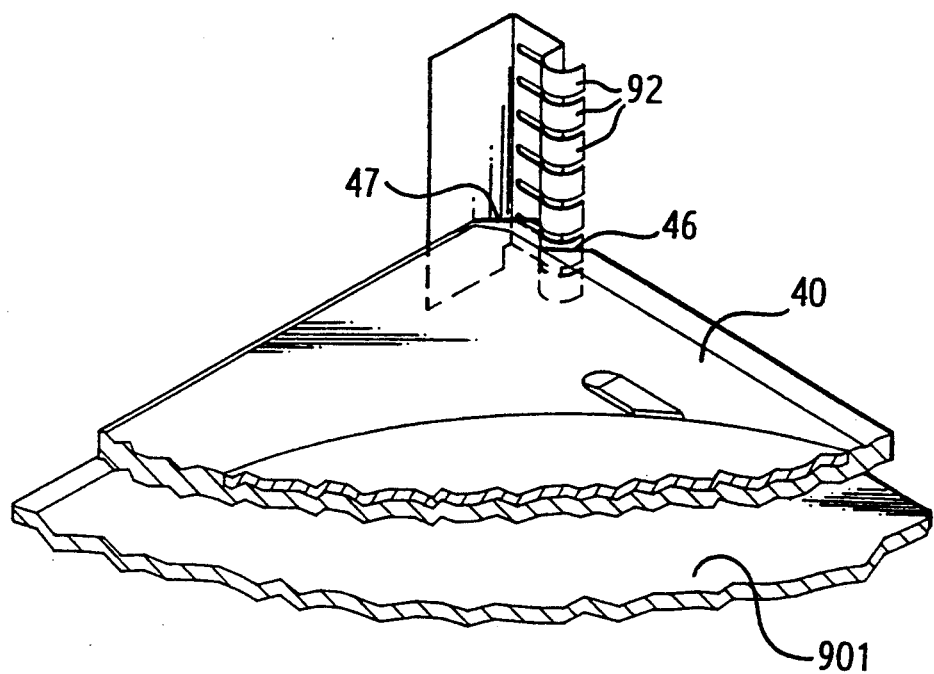
FIG. 13 is a perspective view showing a part of the carriage received in the stacker.

With such arrangement, shuttle 50 may be reciprocated between the leftmost position of FIG. 11(c) right overhead drive pulley 61 and the rightmost position of FIG. 11(d) right overhead slave pulley 62.

Specifically referring now to FIG. 10(a) to FIG. 10(e), stacker 90 is adapted to vertically stack a plurality of (up to seven, in the embodiment disclosed) disks. FIG. 10(a) to FIG. 10(d) show an uppermost position of sacker 90 in which carriage 40 may be installed into the lowest stair or discharged therefrom.

In this embodiment, carriage in the lowest stair is used for single-mode playback, as in the conventional CD player for a single disk. For this purpose, there is provided a switch SW1 for detecting the uppermost position of stacker 90.

On bottom 4 of chassis 1 is mounted a gear 94 driven by motor 93 which, in turn, connected to a drive control circuit 931. A threaded shaft 95 concentrically secured to gear 94 is engageable with a female nut 96 mounted on a bottom plate 901 of stacker 90. Female nut 96 is concentric with a central opening 101 of a disk 100 carried by the instacker carriage, and has a smaller diameter than opening 101 for insertion of threaded shaft 95 into opening 101. A lead of threaded shaft 95 is determined such that stacker 90 is elevated by one stair every half rotation of shaft 95. Stacker 90 is normally biased upwardly by a helical spring 98 surrounding shaft 95. A pair of interconnecting expansion arms 97, 97 horizontally support and stabilize stacker 90.

With such arrangement, when gear 94, and threaded shaft 95 as well, are rotated in the counter-clockwise direction, stacker 90 is lowered through engagement between threaded shaft 95 and female nut 96, against helical spring 98. Along this descending movement of stacker 90, arms 97, 97 are caused to contract.

Figure 15:
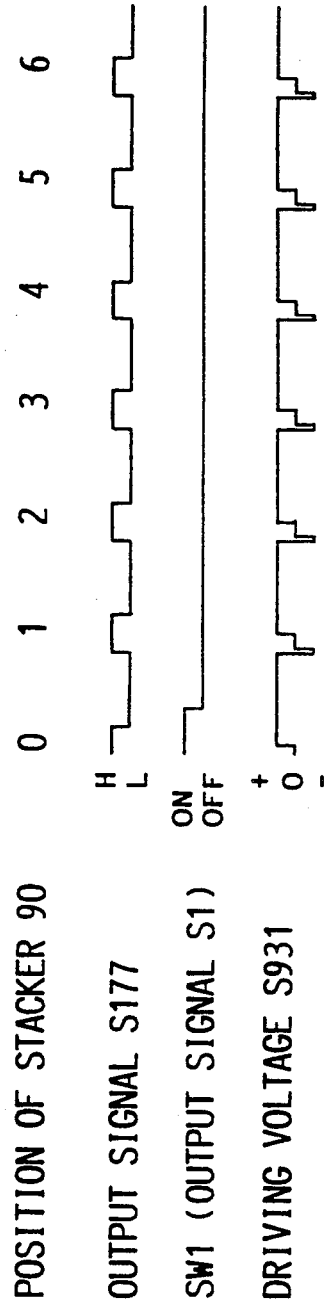
FIG. 15 is a time chart showing elevation of the stacker.

A disk 115 is fixedly attached onto gear 94. A periphery of disk 115 is partly cut out to form a pair of opposed recesses 116, 116 (FIG. 10(c)), by which every half rotation of gear 94 may be detected by a sensor 117 mounted on bottom 4. In response to the rise of an output signal S117 from sensor 117, a minus voltage is applied to motor 93 for reverse rotation in a predetermined period of time, followed by motor 93 being stopped (FIG. 15). Thus, stacker 90 may be lowered from the uppermost position in FIG. 10(d) (Position 0 in FIG. 15) to FIG. 10(e) with temporary stop at every lower stair. The number of rises of output signal S117 is designated by the operator to determine an amount of descent of stacker 90, thereby selecting one of the stairs to or from which carriage 40 is to be loaded or unloaded.

Figure 19:
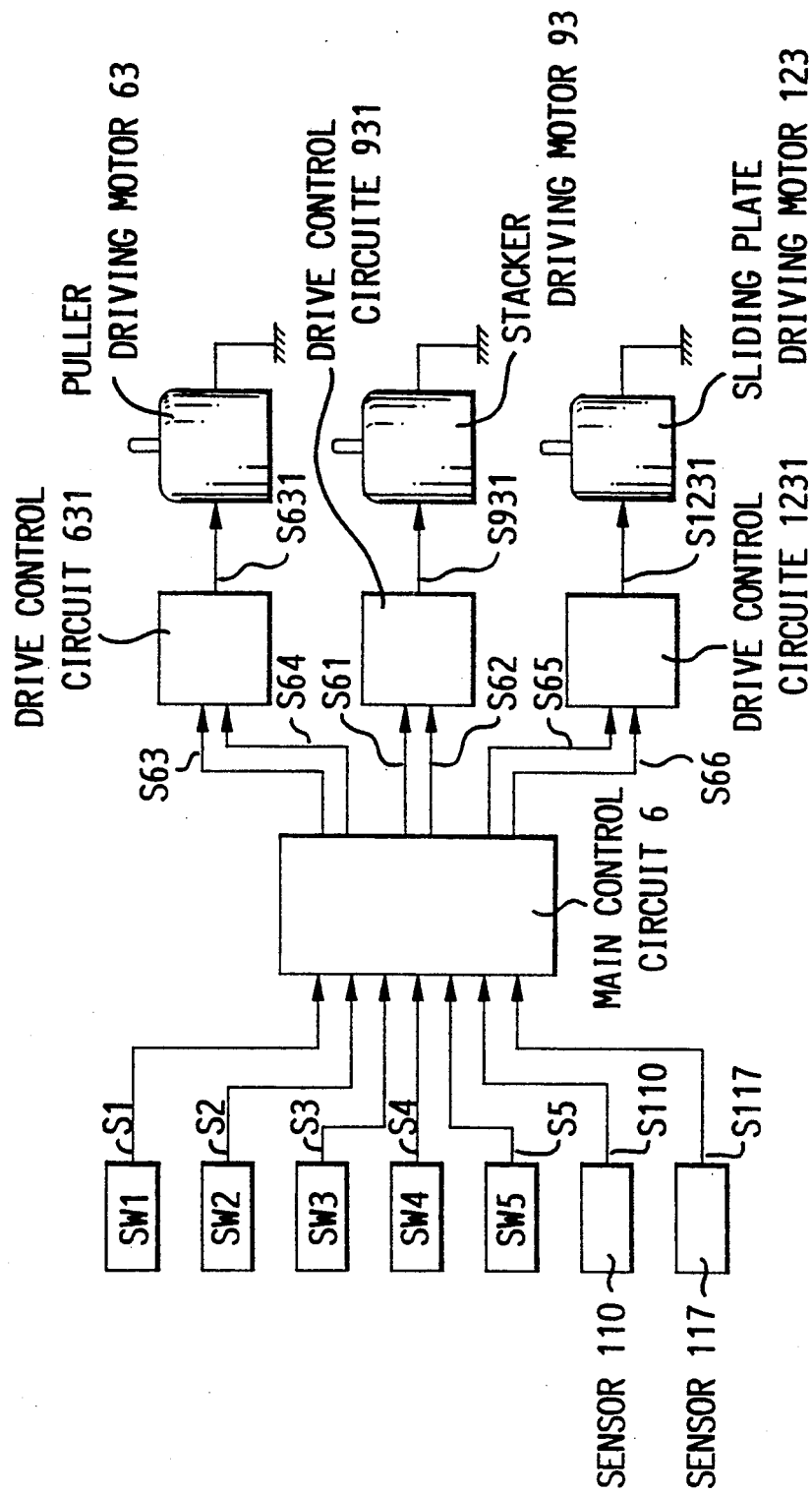
FIG. 19 is a block diagram showing control system for driving motors.

Output signals S1 and S117 of switch SW1 and sensor 117 are inputted to a main control circuit 6 which generates in response thereto an up-command signal S61 or a down-command signal S62 to drive control circuit 931. A driving voltage S931 of a controlled value is outputted from drive control circuit 931 for driving motor 93 under control to ascend or descend stacker 90 (FIG. 19). During vertical movement of stacker 90, threaded shaft 95 is adapted to pass through central opening 101 of disk 100 located on the installed carriage 40.

At an upper peripheral portion of female nut 96, there is provided an annular grove 961 formed between a pair of enlarged flanges 962, 963. Bottom plate 901 of stacker 90 is fitted within annular groove 961 to allow relative rotation between female nut 96 and bottom plate 901. A portion of lower flange 963 extends radially to form an extension 964 including an upward projection 965, which is engageable with a selective one of pits 903 formed concentrically in a semi-circular area of bottom plate 901. This will provide means for initial adjustment of the lowest stair of stacker 90 to be on the same level of the plane of reciprocation of carriage 40.

As shown in FIG. 1(a) to FIG. 1(d), a part of guide bracket 31 to tray 30 extends outwardly to form an extension 310. To side panel 2 of chassis 1 is attached a switch SW5 which is turned ON by contact with extension 310 when tray 30 is in the ejected position shown in FIG. 2(a) and FIG. 2(b).

A reflector sensor 110 is fixedly mounted in chassis 1, and positioned in vertical alignment with pit 308 of tray 30 and pit 48 of the in-tray carriage 40 when tray 30 is in the loaded position. If disk 100 is mounted on carriage 40 which is, in turn, supported on tray 30 in the loaded position, light projecting from sensor 110 passes through pits 308 and 48 to collide with the underside of disk 100 and the reflecting light passing through pits 48 and 308 is detected by sensor 110 itself. Thus, it is discriminated if disk 100 is actually mounted on the in-tray carriage for playback, and the result of detection is represented in a display section (not shown) of the disk player.

Sensor 110 also acts as a timing sensor for detecting an intermediate position of tray 30 between its loaded and ejected positions, during unloading operation of tray 30. Tray 30 is decelerated after passing its intermediate position to assure its stop at the ejected position without overrun.

More particularly, a reflector means such as a tin foil 37 is attached to the underside of tray 30 at the loading-side end thereof in alignment with pit 308 in the loading-/unloading direction. When tray 30 has been moved halfway from the loaded position toward the ejected position, reflector 37 comes to a position right overhead sensor 110. This is achieved when tray 30 reaches the intermediate position which is detected by sensor 110.

Figure 16:
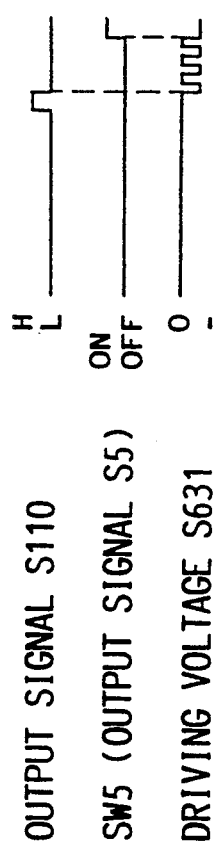
FIG. 16 is a time chart showing ejecting movement of the tray from the loaded position.

As shown in the flow chart of FIG. 16, after the fall of an output signal S110 of sensor 110, motor 63 is given an intermittent supply of driving voltage S631 to thereby decelerate tray 30 which is being moved from the intermediate position toward the ejected position. Then, when tray 30 reaches the ejected position, which is detected by extension 310 of guide bracket 31 colliding with switch SW5 to turn it ON, motor 63 will finally stop in response to the rise of output signal S5 of switch SW5.

Figure 4A:
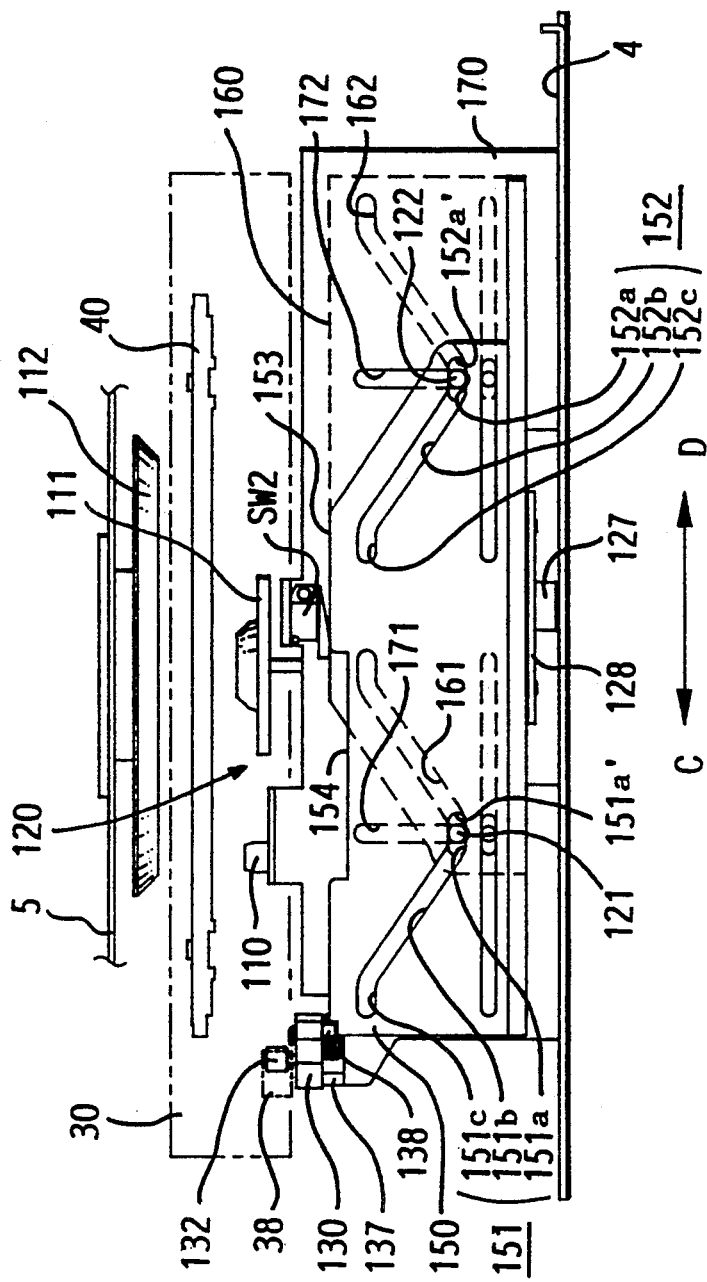
Figure 4B:
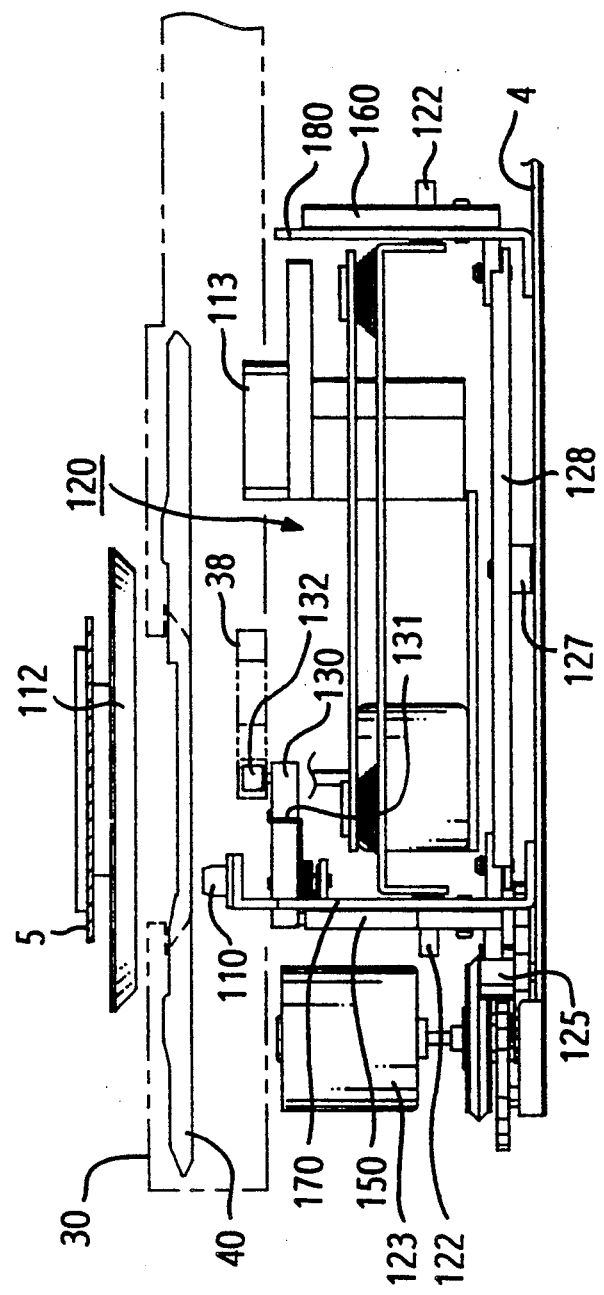

As shown in FIG. 4(a) to FIG. 4(c), a playback mechanism unit generally referred to by a numeral 120 is mounted elevatably in chassis 1. Mechanism unit 120 includes an optical head 113 for reading digital information stored on disk 100, a turntable 111 for rotating disk 100. Other components and elements of mechanism unit 120 are conventional and not shown in the drawings.

In opposition to turntable 111 of mechanism unit 120, clamp device 112 is mounted. Clamp device 112 is rotatably supported by an inverted-U cross-sectional clamp arm 5 bridged between opposite side panels 2, 3 of chassis 1 (FIG. 1(a) and FIG. 1(d). Turntable 111 and clamp device 112 are concentric with the center of tray 30 when it is in the loaded position.

A pair of support frames 170, 180 stand upright from bottom 4 of chassis 1. A pair of sliding plates 150, 160 are attached to the respective frames 170, 180 slidably in arraw-headed directions C and D. Sliding plates 150, 160 respectively have pairs of cam slots 151, 152; 161, 162 for engagement with pins 121, 122 projecting outwardly from the opposite sides of mechanism unit 120, which extend through vertical grooves 171, 172; 181, 182 (not actually shown) in frames 170, 180. Sliding plates 150 and 160 are connected by an interlocking arm 128 rotatable about a pivot 127 (FIG. 4(c)) so that they are interpendently slidable in opposite directions. Along with sliding movement of sliding plates 150, 160, pins 121, 122 are guided along cam slots 151, 152; 161, 162 and along vertical grooves 171, 172; 181, 182, so that mechanism unit 120 may be moved up and down.

Figure 5A:
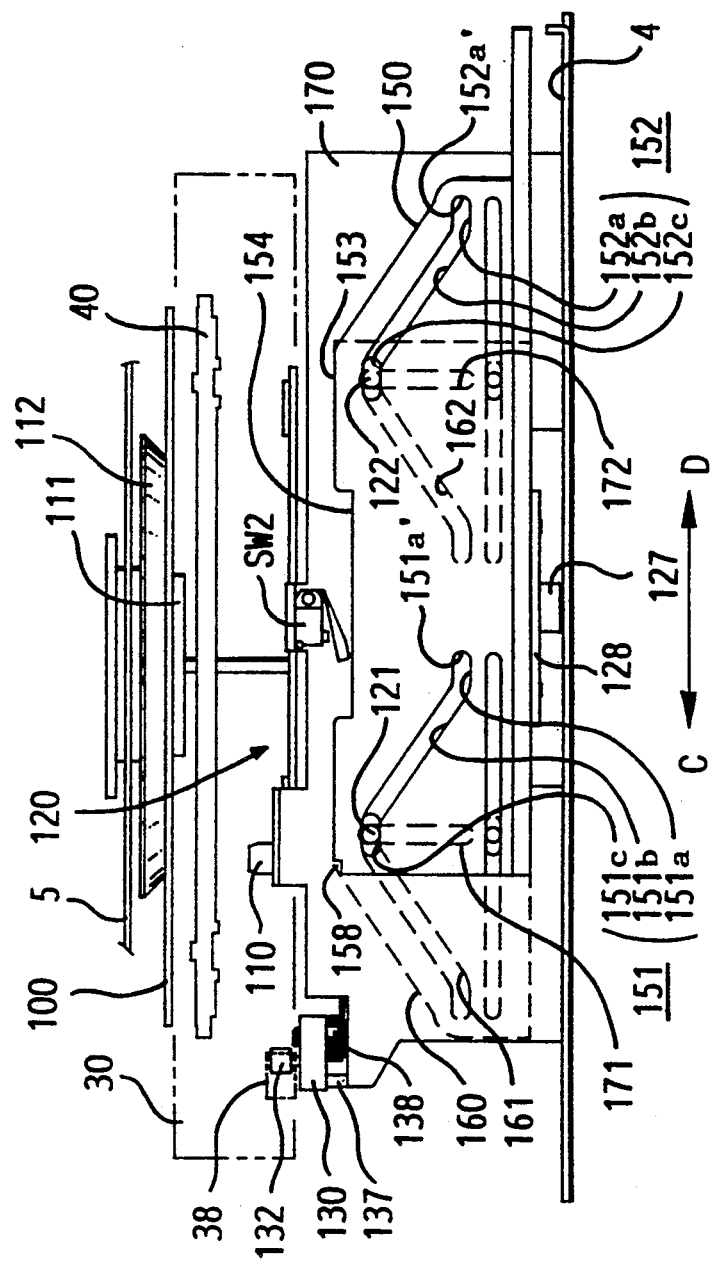
FIG. 5(a) and FIG. 5(b) are front view and plan view particularly showing the lifting device of the player, with the mechanism unit being lifted to its operative position.
Figure 5B:
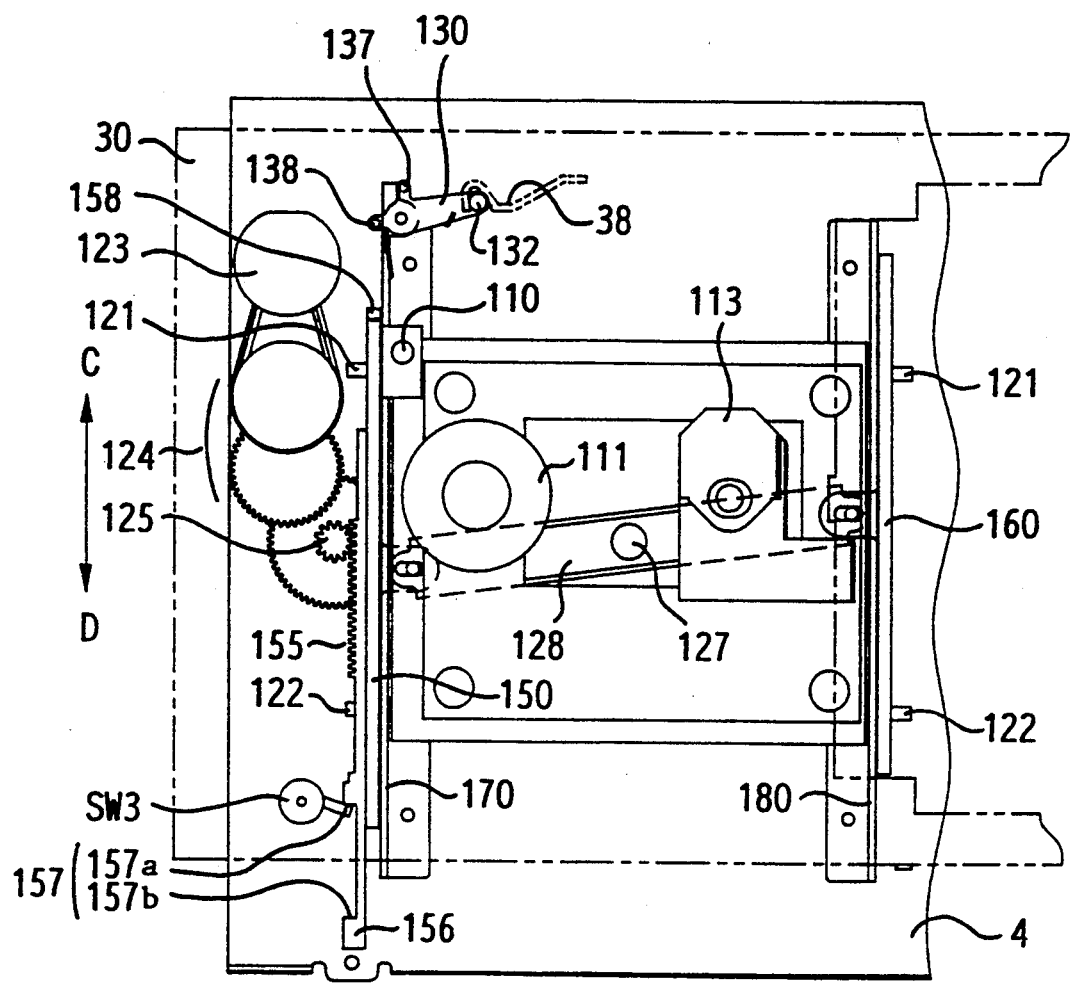

Shown in FIG. 4(a) to FIG. 4(c) is a lowermost standby position of mechanism unit 120 and its uppermost operative position is shown in FIG. 5(a) and FIG. 5(b) in which it is ready for playback for disk 100 on the loaded tray 30.

Cam slots 151, 152 and 161, 162 in sliding plates 150 and 160 are symmetric with each other and oriented in opposite directions. Therefore, explanation will given hereunder particularly about cam sots 151, 152 in sliding plates 150. Each cam slots 151, 152 is integrally composed of an oblique sections 151b, 151c; 152a, 152c extending from the lower and upper ends of oblique section 151b, 152b.

Along the lower end of sliding plate 150 is formed a rack 155 for engagement with a pinion 125 rotatably mounted to bottom 4. Pinion 125 is coupled via a gearing 124 to a motor 123 controlled by a motor drive circuit 1231.

In the standby position of mechanism unit 120 shown in FIG. 4(a) to FIG. 4(c), when motor 123 is rotated to shift sliding plate 150 in the direction of D, arm 128 is caused to rotate in the counterclockwise direction so that the other sliding plate 160 dependently moves in the direction of C at the same speed. Therefore, along with the aforementioned movement of sliding plates 150, 160, pins 121, 122 are guided along cam slots 151, 152; 161, 162, mechanism unit 120 ascends in parallel with bottom 4 to reach at last the operative position shown in FIG. 5(a) and FIG. 5(b).

In the standby position of FIG. 4(a), pins 121, 122 of mechanism unit 120 remain standstill in the middle of first horizontal sections 151a, 152a of cam slots 151, 152. In the operative position of FIG. 5(a), they are positioned in the middle of second horizontal sections 151c, 152c.

A tray lock arm 130 is rotatable about a vertical pivot (not indexed) provided at one upper extreme edge of plate 170 which supports sliding plate 150. One end of tray lock arm 130 has a downward projecting pin 138 engageable with a cutout 158 formed at the upper edge of sliding plate 150, near its one end toward the direction C. A spring 131 coiled around a pivot of arm 130 will normally bias arm 130 to rotate in the counterclockwise direction (FIG. 4(c)). A stopper pin 137 is pushed against supporting plate 170 to prevent further rotation of arm 130. Tray lock arm 130 is provided at the other end with a free roller 132 which projects upwardly to be engageable with a rib 38 formed on the underside of tray 30 (FIG. 4(c), FIG. 5(b)) to lock up tray 30 with respect to mechanism unit 120 and chassis 1.

Switches SW2 and SW3 detect position of sliding plate 150 and mechanism unit 120, respectively. Switch SW2 is mounted on supporting plate 170. When mechanism unit 120 is in its standby position, switch SW2 is ON by contact with top 153 of sliding plate 150 (FIG. 4(a)). In the course of ascent of mechanism unit 120 in response to movement of sliding plate 150 in the direction of D and in its operative position, switch SW2 enters a recess 154 to be turned OFF.

Figure 6A:
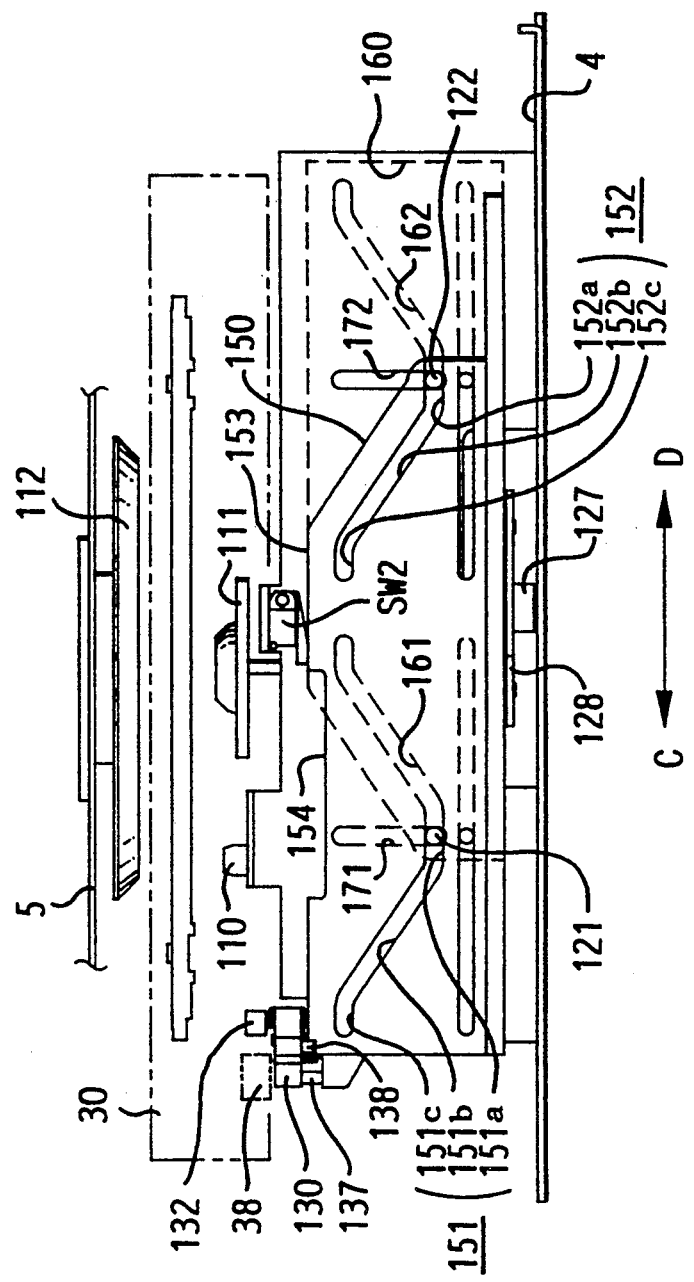
FIG. 6(a) and FIG. 6(b) are front view and plan view of the player, with the tray being disengaged from a tray lock means.
Figure 6B:
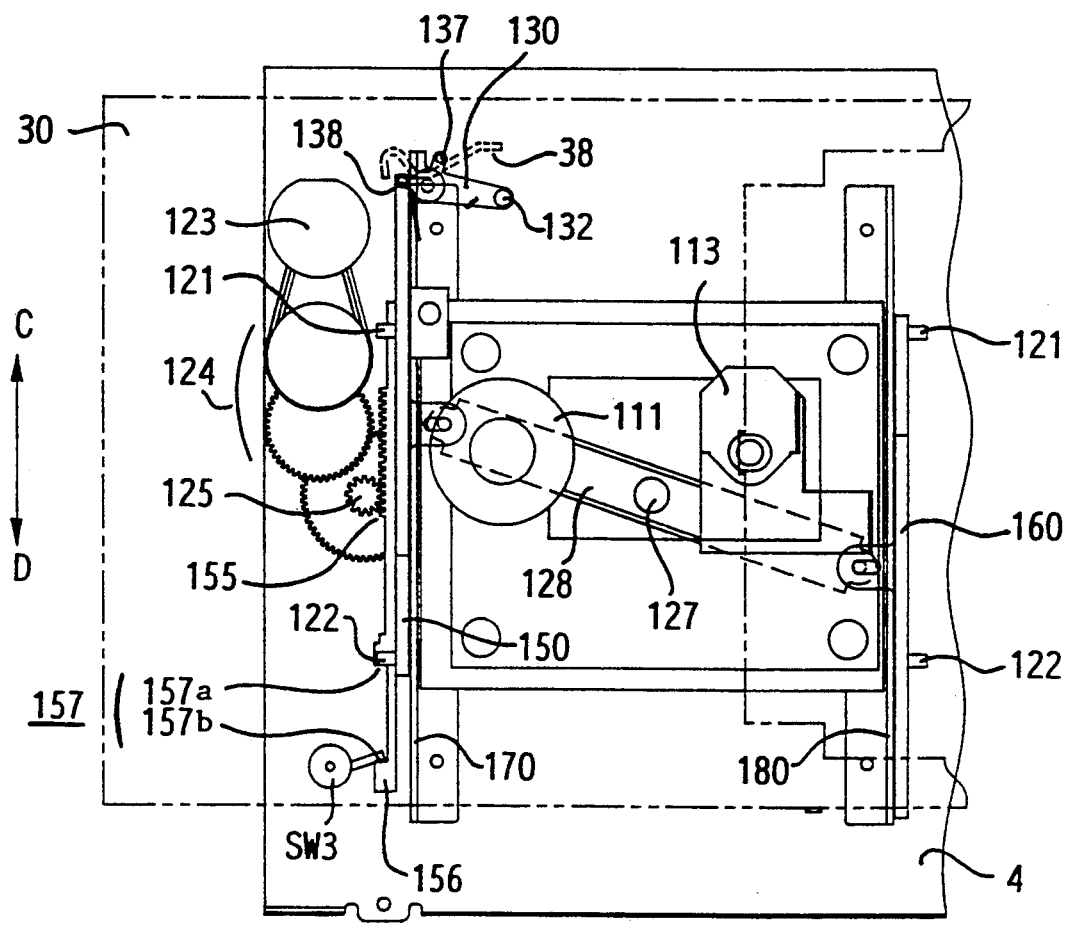

Switch SW3 is mounted on bottom 4 to project toward a recess 157 formed in sliding plate 150 on the side of the direction of D. When mechanism unit 120 is in its operative position, switch SW3 is ON by contact with a wall 157a of recess 157 located at the side of the direction C, as best seen in FIG. 5(b). When sliding plate 150 is further moved from the position of FIG. 4(a) and FIG. 4(b) in the direction of C, so that pins 121, 122 reach the extreme ends 151a', 152a' of first horizontal sections 151a, 152a of cam slots 151, 152, which is shown in FIG. 6(a) and FIG. 6(b), switch SW3 is again turned ON due to contact with another wall 157b of recess 157. Between these extreme positions, including the position of FIG. 4(a) and FIG. 4(b), switch SW3 is OFF in opposition to recess 157.

Outputs S2 and S3 of switches SW2 and SW3 is inputted to main control circuit 6 which, in turn, outputs command signals to motor drive control circuits 1231, 631.

Figure 17:
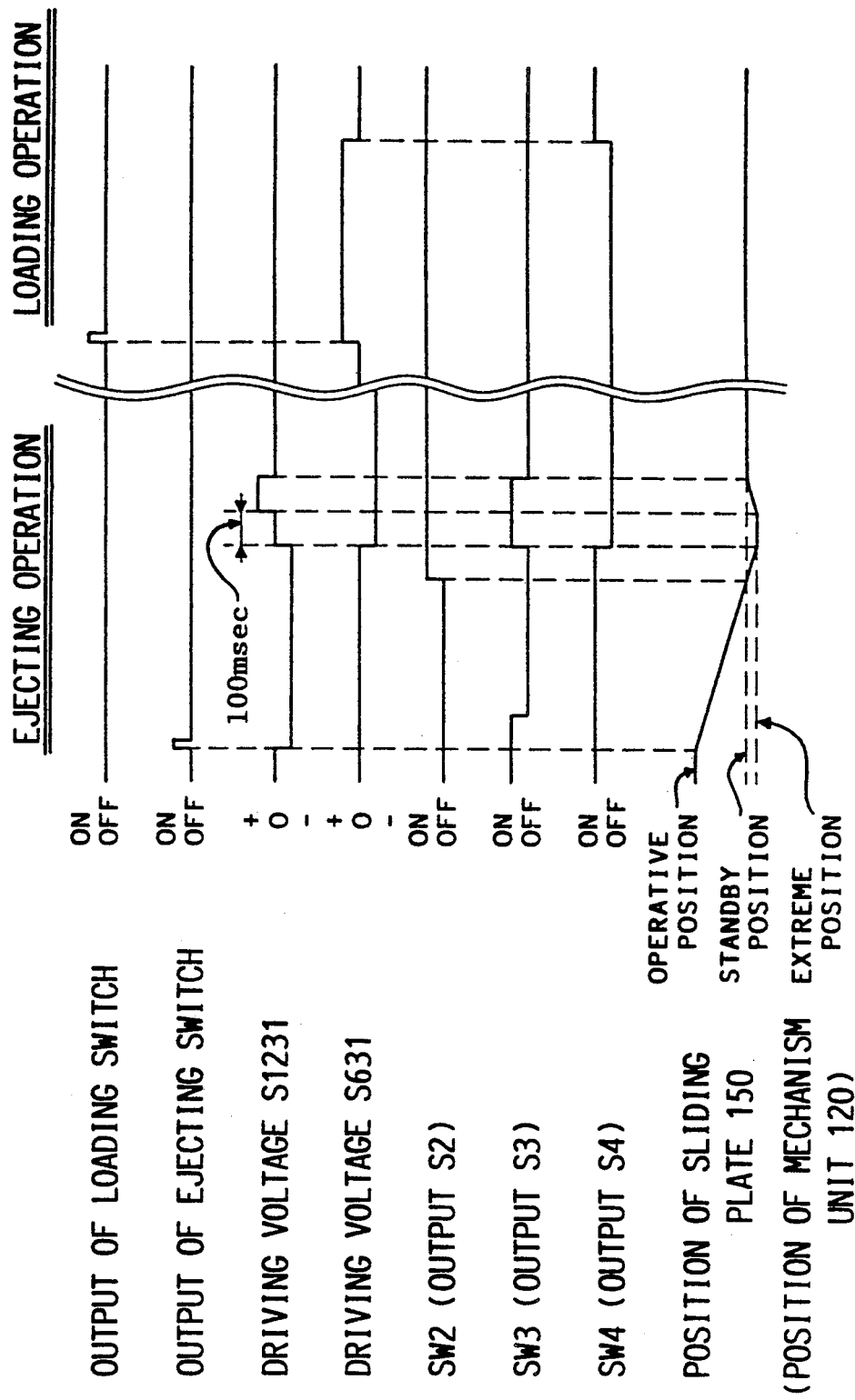
FIG. 17 is a time chart showing ejecting and loading movement of the tray in cooperation with elevation of the disk-reading mechanism unit.

The CD player in this embodiment will operate as follows. Mechanism unit 120 is supposed to stand in the operative position of FIG. 5(a) and FIG. 5(b) for playback for disk 100. Referring additionally to FIG. 17, when an ejecting switch (not shown) is turned on by the operator, main control circuit 6 outputs a down-command signal S66 of "H" level to drive control circuit 1231 so that drive voltage S1231 of a minus value is outputted therefrom to motor 123. Sliding plates 150 and 160 are therefore shifted in the directions of C and D, respectively, at the same speed.

Since operation of sliding plates 150 and 160 are substantially symmetric, the following explanation will be given to one of them, sliding plate 150. Along with movement of sliding plate 150 in the direction of C, pins 121, 122 are guided along oblique sections 151b, 152b of cam slots 151, 152 to lower mechanism unit 120. In the initial stage of such movement, when pins 121, 122 separate from second horizontal sections 151c, 152c to enter oblique sections 151b, 152b, switch SW3 becomes free from contact with wall 157a of recess 157 and output S3 thereof is turned OFF.

When pins 121, 122 are guided into first horizontal sections 151a, 152a, mechanism unit 120 arrives in the standby position of FIG. 4(a) to FIG. 4(c). Output S2 of switch S2 is now turned ON due to contact with top 153 of sliding plate 150. In this position, roller 132 of tray lock arm 130 is still engaged by rib 38 so that tray 30 remains in the locked condition. However, cutout 158 of sliding plate 150 has come to a position in a close vicinity to pin 138 of tray lock arm 130.

Sliding plate 150 is further moved in the direction of C to the extreme position of FIG. 6(a) and FIG. 6(b) in which pin 121, 122 comes into contact with ends 151a', 152a'. During such further movement of sliding plate 150, contact between pin 138 and cutout 158 will rotate tray lock arm 130 in the clockwise direction (FIG. 4(c), FIG. 5(b)), against spring 131, to disengage roller 132 from rib 38. Thus, tray locking function is released and tray 30 becomes free from mechanism unit 120 and chassis 1. Tray 30 may now be shifted toward the ejected position along with movement of shuttle 50.

This extreme position of sliding plate 150 is detected by switch SW3 which comes into contact with wall 157b of recess 157 and output S3 of which is again turned ON. In response to such detection, main control circuit 6 will operate such that down-command signal S66 becomes "L" level to supply no drive voltage S1231 to motor 1231, thereby stopping sliding plate 150 at that position. At the same time, an eject-command signal S63 is turned to "H" level so that a minus driving voltage S631 is outputted from drive control circuit 631. Pulley drive motor 63 is thus rotated to move shuttle 50, thereby ejecting tray 30. When tray 30 starts moving in the unloading direction, switch SW4 (FIG. 1(b)) becomes free from contact with the end of tray 30 so that output S4 thereof is turned OFF.

In the embodiment disclosed, main control circuit 6 turns an up-command signal S65 to "H" level, after a predetermined short period of time, for example 100 msec, following the rise of output S3 of switch SW3. This means that a plus driving voltage S1231 is outputted from motor drive circuit 1231 to cause sliding plate 150 to start moving in the direction of D, after it has reached the extreme position of FIG. 6(a) and FIG. 6(b). This reverse movement of sliding plate 150 is terminated by stopping supply of driving voltage S1231 to motor 1231, in response to the fall of output signal S3 of switch SW3, which is established when sliding plate 150 reaches the position of FIG. 4(a) to FIG. 4(c) to disengage switch SW3 from wall 157b of recess 157.

During the reverse movement of sliding plate 150, as shown in FIG. 7, tray lock arm 130 is rotated in the counter-clockwise direction under a bias of spring 131 until pin 137 collides with supporting plate 170. In this position, tray lock arm 130 awaits loading of tray 30.

More particularly, when a loading switch is operated by the operator where tray 30 stands in the ejected position of FIG. 2(a) and FIG. 2(b), main control circuit 6 turns a loading-command signal S64 to be "H" for generating a plus driving voltage S631 from drive control circuit 631. Pulley drive motor 63 is thus rotated to move shuttle 50 and tray 30 in the loading direction. When tray 30 arrives in the loaded position of FIG. 1(b) and FIG. 1(c), output S4 of switch SW4 is turned ON. Main control circuit 6 turns loading-command signal S64 to be "L" to stop generating drive voltage S631, so that tray 30 could stop at the loaded position.

When tray 30 is moved from the ejected position to arrive in a halfway position somewhat succeeding the position of FIG. 7, tray lock arm 130 is rotated in the clockwise direction by contact between roller 132 and rib 38. Further advancement of tray 30 established engagement between roller 132 and rib 38 to hold tray 30 in the loaded position of FIG. 4(c). This means that once tray 30 reaches the loaded position, it is automatically locked up by tray lock arm 130 in that position.

Figure 18:
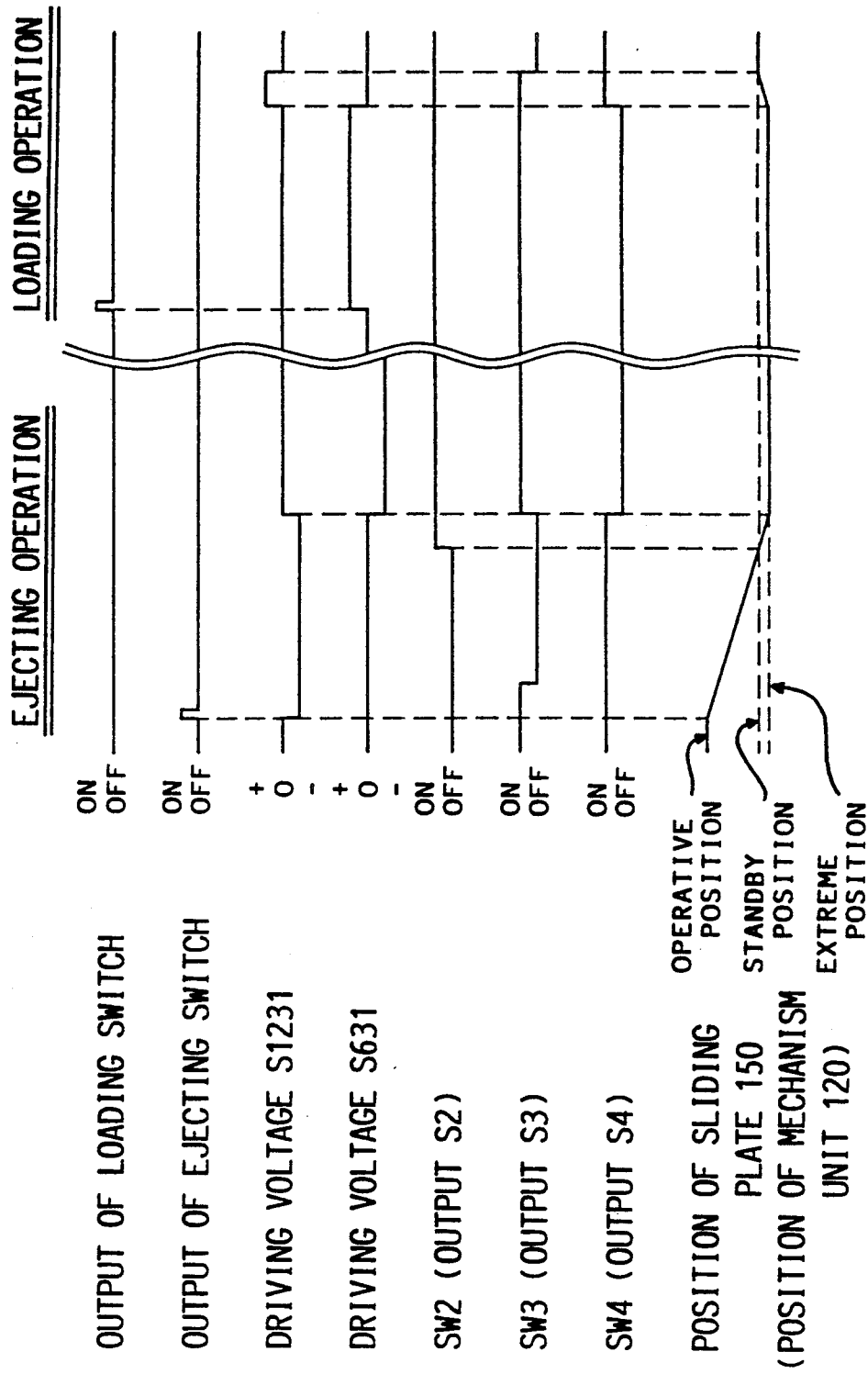
FIG. 18 is a time chart similar to FIG. 17, in a modified embodiment.

The timing charts of FIG. 18 show another arrangement in which sliding plate 150 remains in the extreme position of FIG. 6(a) and FIG. 6(b), with no reverse action, after tray 30 has been unlocked during the tray unloading operation. When output S3 of switch SW3 is turned ON in the extreme position of sliding plate 150, main control circuit 6 commands that no driving voltage S1231 is outputted from drive control circuit 1231, in the same manner as in the above-described example.

In this modified example, however, down-command signal S66 is maintained to be "L" level until tray 30 is next moved to the loaded position. When tray 30 arrives in the loaded position, which is detected by output S4 of switch SW4 being turned ON, loading-command signal S64 is turned to "L" level to stop tray 30 in that position. At the same time, up-command signal S65 is turned to "H" level so that a plus driving voltage S1231 is outputted form motor drive circuit 1231, thereby moving sliding plate 150 in the direction of D.

When sliding plate 150 is moved to stand in the position of FIG. 4(a) and FIG. 4(c), switch SW3 is separated from wall 157b of recess 157 and output S3 thereof is again turned OFF. Supply of driving voltage S1231 is now discontinued to stop sliding plate 150 in that position, which awaits further loading of tray 30.

Although the invention has been described in conjunction with a specific embodiment thereof, it is to be understood that many variations and modifications may be made without departing from spirit and scope of the invention as defined in the appended claims.

What is claimed is:

1. In a disk player having a main body, disk-storage means elevatably mounted in the main body and adapted to receive a plurality of disks, a disk-reading device for playback of the disk, a disk-conveying device for conveying a disk between a first position wherein it is stored in one of stairs in the disk-storage means and a second position wherein it can be read by said disk-reading device and a mechanism for elevation of said disk-storage means relative to said main body comprising:

a driving source;
a threaded shaft rotated by said driving source;
a nut movable together with said disk-storage means in engagement with said threaded shaft to move said disk-storage means in response to rotation of said threaded shaft; and
adjusting means for rotational adjustment of the fixed position of said nut relative to said disk-storage means, wherein said adjusting means comprises a plurality of apertures concentrically arranged on said disk-storage means, a projection extending in an axial direction from said nut at a point offset from a center thereof for engagement with one of said apertures.

* * * * *